United States Patent
Tizhoosh et al.

(10) Patent No.: US 12,451,235 B2
(45) Date of Patent: Oct. 21, 2025

(54) SYSTEMS AND METHODS FOR AUTOMATICALLY DIAGNOSING X-RAY IMAGES

(71) Applicant: Hamid Reza Tizhoosh, Rochester, MN (US)

(72) Inventors: Hamid Reza Tizhoosh, Rochester, MN (US); Ho Yin Sze-To, Tuen Mun (HK)

(73) Assignee: Hamid Reza Tizhoosh, Rochester, MN (US)

( * ) Notice: Subject to any disclaimer, the term of this patent is extended or adjusted under 35 U.S.C. 154(b) by 420 days.

(21) Appl. No.: 17/980,064

(22) Filed: Nov. 3, 2022

(65) Prior Publication Data

US 2023/0119642 A1   Apr. 20, 2023

Related U.S. Application Data

(63) Continuation of application No. PCT/CA2021/050582, filed on Apr. 28, 2021.

(Continued)

(51) Int. Cl.
 *G16H 30/40* (2018.01)
 *A61B 6/00* (2024.01)
 (Continued)

(52) U.S. Cl.
 CPC ........... *G16H 30/40* (2018.01); *A61B 6/5217* (2013.01); *G06T 7/0014* (2013.01); *G06T 7/11* (2017.01);
 (Continued)

(58) Field of Classification Search
 CPC ........ G16H 30/40; G16H 50/20; G16H 15/00; G16H 40/67; G16H 50/70; A61B 6/5217;
 (Continued)

(56) References Cited

U.S. PATENT DOCUMENTS 11,537,506 B1 * 12/2022 Dasgupta ................. G06N 3/10
12,292,926 B2 *  5/2025 Habbecke .............. A61B 34/10
(Continued)

FOREIGN PATENT DOCUMENTS

WO    WO-2019183712 A1 * 10/2019 ........... G06F 16/583

OTHER PUBLICATIONS

Zotin Aleksandr, Lung boundary detection for chest X-ray images classification based on GLCM and probabilistic neural networks, Procedia Computer Science, vol. 159, 2019, pp. 1439-1448, ISSN 1877-0509, https://doi.org/10.1016/j.procs.2019.09.314. (Year: 2019).*

(Continued)

*Primary Examiner* — Vu Le
(74) *Attorney, Agent, or Firm* — WOMBLE BOND DICKINSON (US) LLP

(57) ABSTRACT

Various systems, methods, and non-transitory computer readable mediums for diagnosing a query X-ray image are disclosed. Example embodiments relate to operating the system to apply an artificial neural network model to the query X-ray image to extract a query feature vector representative of image characteristics of the query X-ray image; compare the query feature vector with one or more annotated feature vectors associated with respective one or more annotated X-ray images stored in an annotated image database to determine a similarity level between the query X-ray image and each annotated image of the one or more annotated images; associate the query X-ray image with a set of annotated images based at least on the similarity level and a similarity threshold; and assign the query X-ray image with a disease classification based at least on the disease classification of one or more annotated images of the set of annotated images.

24 Claims, 27 Drawing Sheets

Related U.S. Application Data

(60) Provisional application No. 63/020,119, filed on May 5, 2020, provisional application No. 63/154,078, filed on Feb. 26, 2021.

(51) Int. Cl.

| | | |
|---|---|---|
| *G06T 7/00* | (2017.01) | |
| *G06T 7/11* | (2017.01) | |
| *G06V 10/82* | (2022.01) | |
| *G16H 50/20* | (2018.01) | |

(52) U.S. Cl.
CPC .............. *G06V 10/82* (2022.01); *G16H 50/20* (2018.01); *G06T 2207/10116* (2013.01); *G06T 2207/20021* (2013.01); *G06T 2207/20084* (2013.01); *G06T 2207/30061* (2013.01)

(58) Field of Classification Search
CPC ............... G06T 7/0014; G06T 7/11; G06T 2207/10116; G06T 2207/20021; G06T 2207/20084; G06T 2207/30061; G06V 10/82; G06V 2201/031; G06F 18/2414; G06N 3/045; G06N 3/082; G06N 20/00; G06N 3/084; G06N 3/088
See application file for complete search history.

(56) References Cited

U.S. PATENT DOCUMENTS

| | | | | |
|---|---|---|---|---|
| 2019/0295710 | A1* | 9/2019 | Kusnoto | G06F 16/532 |
| 2020/0019617 | A1* | 1/2020 | Eswaran | G06T 7/0016 |
| 2021/0042916 | A1* | 2/2021 | Zhang | A61B 6/50 |
| 2021/0151171 | A1* | 5/2021 | Lee | G16H 30/40 |
| 2022/0068498 | A1* | 3/2022 | Tizhoosh | G16H 15/00 |

OTHER PUBLICATIONS

International Search Report and Written Opinion mailed Aug. 9, 2021 in PCT/CA2021/050582.

M. M. Rahman et al., "A Framework for Medical Image Retrieval Using Machine Learning and Statistical Similarity Matching Techniques With Relevance Feedback," in IEEE Transactions on Information Technology in Biomedicine, vol. 11, No. 1, pp. 58-69, Jan. 2007, doi: 10.1109/TITB.2006.884364.

Wang, Xiaosong et al., "ChestX-Ray8: Hospital-Scale Chest X-Ray Database and Benchmarks on Weakly-Supervised Classification and Localization of Common Thorax Diseases," in 2017 IEEE Conference on Computer Vision and Pattern Recognition (CVPR), doi: 10.1109/CVPR.2017.369 (18 pages).

Sze-To, A. et al., "Searching for pneumothorax in x-ray images using autoencoded deep features." Sci Rep 11, 9817 (2021). doi: 10.1038/s41598-021-89194-4 (13 pages).

A. Ebrahimian et al., "Class-Aware Image Search for Interpretable Cancer Identification," in IEEE Access, vol. 8, pp. 197352-197362, 2020, doi: 10.1109/ACCESS.2020.3033492.

Sze-To, Antonio et al., "Searching for Pneumothorax in Half a Million Chest X-Ray Images." AIME (2020). arXiv:2007.15429v1 (10 pages).

A. Irfan et al., "Classifying Pneumonia among Chest X-Rays Using Transfer Learning," 2020 42nd Annual International Conference of the IEEE Engineering in Medicine & Biology Society (EMBC), 2020, pp. 2186-2189, doi: 10.1109/ EMBC44109.2020.9175594.

Rajpurkar, Pranav et al. "CheXNet: Radiologist-Level Pneumonia Detection on Chest X-Rays with Deep Learning." 2017, arXiv:1711. 05225v3 (7 pages).

Johnson, Alistair E. W. et al. "MIMIC-CXR: A large publicly available database of labeled chest radiographs." 2019, arXiv:1901. 07042v5 (7 pages).

\* cited by examiner

| | MIMIC-CXR[20,37] | CheXpert[15] | ChestX-ray14[a] | Total |
|---|---|---|---|---|
| +ve:Pneumothorax | 11,610 | 17,693 | 5,302 | 34,605 |
| -ve:Normal | 82,668 | 16,974 | 60,361 | 160,003 |
| Total | 94,278 | 34,667 | 65,663 | 194,608 |

FIG. 20A

| | MIMIC-CXR[20,37] | CheXpert[15] | ChestX-ray14[a] | Total |
|---|---|---|---|---|
| +ve:Pneumothorax | 11,610 | 17,693 | 5,302 | 34,605 |
| -ve:Non-Pneumothorax | 236,626 | 173,334 | 106,818 | 516,778 |
| Total | 248,236 | 191,027 | 112,120 | 551,383 |

FIG. 20B

| Method | ROC |
|---|---|
| Image Search (k=11) (Configuration 1: Entire) (1024 Dim) | 0.87777 ± 0.00218 |
| Image Search (k=11) (Configuration 2 – Left,Right-Flip) (2048 Dim) | 0.86947 ± 0.00260 |
| Image Search (k=11) (Configuration 3 – Left, Right-Flip, Entire) (3072 Dim) | 0.88335 ± 0.00254 |
| Image Search (k=51) (Configuration 1: Entire) (1024 Dim) | 0.89062 ± 0.00181 |
| Image Search (k=51) (Configuration 2 – Left,Right-Flip) (2048 Dim) | 0.88336 ± 0.00220 |
| Image Search (k=51) (Configuration 3 – Left, Right-Flip, Entire) (3072 Dim) | 0.89461 ± 0.00173 |

FIG. 21A

| Method | ROC |
|---|---|
| Image Search (k=11) (Configuration 1: Entire) (1024 Dim) | 0.69073 ± 0.00286 |
| Image Search (k=11) (Configuration 2 – Left,Right-Flip) (2048 Dim) | 0.69961 ± 0.00316 |
| Image Search (k=11) (Configuration 3 – Left, Right-Flip, Entire) (3072 Dim) | 0.72202 ± 0.00271 |
| Image Search (k=51) (Configuration 1: Entire) (1024 Dim) | 0.74263 ± 0.00253 |
| Image Search (k=51) (Configuration 2 – Left,Right-Flip) (2048 Dim) | 0.74670 ± 0.00247 |
| Image Search (k=51) (Configuration 3 – Left, Right-Flip, Entire) (3072 Dim) | 0.76425 ± 0.00205 |

FIG. 21B

| Method | ROC |
|---|---|
| CheXNet® | 0.87985 ± 0.00164 |
| Image Search (k=11) (Configuration 3 – Left, Right-Flip, Entire) (3072 Dim) | 0.88335 ± 0.00254 |
| Image Search (k=11) (Configuration 3 – Left, Right-Flip, Entire) (3072>256 Dim) | 0.89932 ± 0.00185 |
| Image Search (k=51) (Configuration 3 – Left, Right-Flip, Entire) (3072 Dim) | 0.89461 ± 0.00173 |
| Image Search (k=51) (Configuration 3 – Left, Right-Flip, Entire) (3072>256 Dim) | 0.91836 ± 0.00179 |

FIG. 22A

| Method | ROC |
|---|---|
| CheXNet® | 0.76619 ± 0.00272 |
| Image Search (k=11) (Configuration 3 – Left, Right-Flip, Entire) (3072 Dim) | 0.72202 ± 0.00271 |
| Image Search (k=11) (Configuration 3 – Left, Right-Flip, Entire) (3072>256 Dim) | 0.73992 ± 0.00203 |
| Image Search (k=51) (Configuration 3 – Left, Right-Flip, Entire) (3072 Dim) | 0.76425 ± 0.00205 |
| Image Search (k=51) (Configuration 3 – Left, Right-Flip, Entire) (3072>256 Dim) | 0.79655 ± 0.00215 |

FIG. 22B

SYSTEMS AND METHODS FOR AUTOMATICALLY DIAGNOSING X-RAY IMAGES

CROSS-REFERENCE TO RELATED APPLICATIONS

This application is a continuation of PCT Patent Application No. PCT/CA2021/050582, filed on Apr. 28, 2021, which claims the benefit of U.S. Provisional Patent Application No. 63/020,119, filed on May 5, 2020, and U.S. Provisional Patent Application No. 63/154,078, filed on Feb. 26, 2021. The complete disclosure of each of PCT Patent Application No. PCT/CA2021/050582, U.S. Provisional Patent Application No. 63/020,119, and U.S. Provisional Patent Application No. 63/154,078 is incorporated herein by reference for all purposes.

FIELD

The described embodiments relate to systems and methods for automatically diagnosing medical images. In some example embodiments, the systems and methods relate to X-ray images.

BACKGROUND

Radiologists may typically process many X-ray studies daily. With the increasing workload, the large volume of work for radiologists can delay diagnosis and treatment. Due at least to the volume of work, the limits of imaging devices, and the anatomic complexity of diseases, even the most experienced expert may miss the subtleties of an image. Since a wrong or delayed diagnosis can be harmful to patients, computer-implemented solutions that can improve at least the diagnosis process are desirable.

SUMMARY

The various embodiments described herein generally relate to methods (and associated systems configured to implement the methods) for automatically diagnosing medical images. The disclosed systems and methods relate to X-ray images.

An example method for diagnosing a query X-ray image can involve applying an artificial neural network model to the query X-ray image to extract a query feature vector representative of image characteristics of the query X-ray image; comparing the query feature vector with one or more annotated feature vectors associated with respective one or more annotated X-ray images stored in an annotated image database to determine a similarity level between the query X-ray image and each annotated X-ray image of the one or more annotated X-ray images; associating the query X-ray image with a set of annotated X-ray images based at least on the similarity level and a similarity threshold; and assigning the query X-ray image with a disease classification based at least on the disease classification of one or more annotated X-ray images of the set of annotated X-ray images.

In some embodiments, the method can further involve preprocessing the query X-ray image prior to applying the artificial neural network model to the query X-ray image.

In some embodiments, preprocessing the query X-ray image can involve dividing the query X-ray image into one or more query image portions.

In some embodiments, applying the artificial neural network model to the query X-ray image to extract the query feature vector representative of image characteristics of the query X-ray image can involve applying the artificial neural network model to each query image portion of the one or more query image portions to generate a respective query image portion feature vector representative of the image characteristics of that query image portion; and combining the respective query image portion feature vectors to generate the query feature vector.

In some embodiments, the method can further involve applying the artificial neural network model to the query X-ray image to generate an entire image query feature vector representative of the image characteristics of the query X-ray image; and combining the respective query image portion feature vectors and the entire image query feature vector to generate the query feature vector.

In some embodiments, dividing the query X-ray image into the one or more query image portions can involve dividing the query X-ray image substantially equally to generate a first and a second query image portion.

In some embodiments, the query X-ray image can include an X-ray image of a lung, and the first and the second query image portions each corresponding to a left-side of the lung and a right-side of the lung, respectively.

In some embodiments, the method can further involve horizontally flipping the second query image portion corresponding to the right-side of the lung.

In some embodiments applying the artificial neural network model to the query X-ray image to extract the query feature vector representative of the image characteristics of the query X-ray image can involve dividing the query X-ray image into one or more query image portions; generating a value to represent the image characteristics within each query image portions of the one or more query image portions; and generating the query feature vector to include the value for each query image portion.

In some embodiments, the method can further involve comparing the query feature vector with the one or more annotated feature vectors to determine the similarity level between each query image portion and a related annotated image portion of the one or more annotated X-ray images; associating each query image region with a set of annotated image portions based at least on the similarity level and the similarity threshold; and assigning each query image portion with the disease classification based at least on the disease classification of one or more annotated image portions of the set of annotated image portions.

In some embodiments, the method can further involve defining a set of related query image portions for each query image portion assigned the disease classification associated with a disease present identifier; and for each related query image portion, applying the artificial neural network model to extract a related query image region feature vector representative of image characteristics of that related query image portion; comparing the related query image region feature vector with one or more annotated image region feature vectors associated with respective one or more annotated image portions to determine the similarity level between that related query image portion and each annotated image portion; associating that related query image portion with a set of annotated image portions based at least on the similarity level and the similarity threshold; and assigning that related query image portion with the disease classification based at least on the disease classification of one or more annotated image portions.

In some embodiments, the method can further involve identifying a diseased region within the query X-ray image based on one or more related query image portions assigned with the disease classification associated with the disease present identifier.

In some embodiments, defining the set of related query image portions for each query image portion assigned the disease classification associated with the disease present identifier can involve dividing the query image portion into one or more related query image portions.

In some embodiments, defining the set of related query image portions for each query image portion assigned the disease classification associated with the disease present identifier can involve defining one or more related query image portions based on a predefined distance from a center of that query image portion.

In some embodiments, the one or more related query image portions can include an overlapping portion with each other.

In some embodiments, comparing the query feature vector with the one or more annotated feature vectors to determining the similarity level can involve applying a distance transform to the query feature vector and each annotated feature vector; and assigning the similarity level based on a distance generated from applying the distance transform, wherein the similarity level increases with shorter distances.

In some embodiments, applying the distance transform to the query feature value and each annotated feature vector can involve determining a Euclidean distance between the query feature vector and each annotated feature vector.

In some embodiments, the similarity threshold can include a predefined number of images; and associating the query X-ray image with the set of annotated X-ray images based at least on the similarity level and the similarity threshold can involve selecting the predefined number of annotated X-ray images associated with a highest similarity level to the query X-ray image.

In some embodiments, assigning the query X-ray image with the disease classification based at least on the disease classification of one or more annotated X-ray images of the set of annotated X-ray images can involve determining the disease classification of a majority of annotated X-ray images within the set of annotated X-ray images; and assigning the query X-ray image with the determined disease classification.

In some embodiments, assigning the query X-ray image with the disease classification based at least on the disease classification of one or more annotated X-ray images of the set of annotated X-ray images can involve assigning the query X-ray image with one of a disease present identifier and a disease absent identifier.

In some embodiments, the disease present identifier can correspond to a disease type.

In some embodiments, each of the disease present identifier and the disease absent identifier can include a probability value.

In some embodiments, the disease present identifier can include a value indicating a presence of disease and the disease absent identifier can include a value indicating an absence of disease.

In some embodiments, the method can further involve determining the similarity threshold based at least on a number of the one or more annotated X-ray images in the annotated image database and a disease type for which the query X-ray image is being diagnosed.

In some embodiments, the artificial neural network model can include a deep neural network model.

In some embodiments, the one or more annotated X-ray images can include one or more X-ray images associated with one of a disease present identifier and a disease absent identifier.

In some embodiments, the disease present identifier can include a value indicating a presence of disease and the disease absent identifier can include a value indicating an absence of disease.

In another broad aspect, a system for diagnosing a query X-ray image is disclosed herein. The system can include a communication component and a processor in communication with the communication component. The communication component can provide access to one or more X-ray images via a network. The processor can be operable to, apply an artificial neural network model to the query X-ray image to extract a query feature vector representative of image characteristics of the query X-ray image; compare the query feature vector with one or more annotated feature vectors associated with respective one or more annotated X-ray images stored in an annotated image database to determine a similarity level between the query X-ray image and each annotated X-ray image of the one or more annotated X-ray images; associate the query X-ray image with a set of annotated X-ray images based at least on the similarity level and a similarity threshold; and assign the query X-ray image with a disease classification based at least on the disease classification of one or more annotated X-ray images of the set of annotated X-ray images.

In some embodiments, the processor can be further operable to preprocess the query X-ray image prior to applying the artificial neural network model to the query X-ray image.

In some embodiments, the processor can be operable to divide the query X-ray image into one or more query image portions.

In some embodiments, the processor can be operable to, apply the artificial neural network model to each query image portion of the one or more query image portions to generate a respective query image portion feature vector representative of the image characteristics of that query image portion; and combine the respective query image portion feature vectors to generate the query feature vector.

In some embodiments, the processor can be further operable to apply the artificial neural network model to the query X-ray image to generate an entire image query feature vector representative of the image characteristics of the query X-ray image; and combine the respective query image portion feature vectors and the entire image query feature vector to generate the query feature vector.

In some embodiments, the processor can be operable to divide the query X-ray image substantially equally to generate a first and a second query image portion.

In some embodiments, the query X-ray image can include an X-ray image of a lung, and the first and the second query image portions each corresponding to a left-side of the lung and a right-side of the lung, respectively.

In some embodiments, the processor can be further operable to horizontally flip the second query image portion corresponding to the right-side of the lung.

In some embodiments, the processor can be operable to: divide the query X-ray image into one or more query image portions; generate a value to represent the image characteristics within each query image portions of the one or more query image portions; and generate the query feature vector to include the value for each query image portion.

In some embodiments, the processor can be further operable to, compare the query feature vector with the one or more annotated feature vectors to determine the similarity level between each query image portion and a related annotated image portion of the one or more annotated X-ray images; associate each query image region with a set of annotated image portions based at least on the similarity level and the similarity threshold; and assign each query image portion with the disease classification based at least on the disease classification of one or more annotated image portions of the set of annotated image portions.

In some embodiments, the processor can be further operable to: define a set of related query image portions for each query image portion assigned the disease classification associated with a disease present identifier; and for each related query image portion, apply the artificial neural network model to extract a related query image region feature vector representative of image characteristics of that related query image portion; compare the related query image region feature vector with one or more annotated image region feature vectors associated with respective one or more annotated image portions to determine the similarity level between that related query image portion and each annotated image portion; associate that related query image portion with a set of annotated image portions based at least on the similarity level and the similarity threshold; and assign that related query image portion with the disease classification based at least on the disease classification of one or more annotated image portions.

In some embodiments, the processor can be further operable to identify a diseased region within the query X-ray image based on one or more related query image portions assigned with the disease classification associated with the disease present identifier.

In some embodiments, the processor can be operable to divide the query image portion into one or more related query image portions.

In some embodiments, the processor can be operable to define one or more related query image portions based on a predefined distance from a center of that query image portion.

In some embodiments, the one or more related query image portions can include an overlapping portion with each other.

In some embodiments, the processor can be operable to: apply a distance transform to the query feature vector and each annotated feature vector; and assign the similarity level based on a distance generated from applying the distance transform, wherein the similarity level increases with shorter distances.

In some embodiments, the processor can be operable to determine a Euclidean distance between the query feature vector and each annotated feature vector.

In some embodiments, the similarity threshold can include a predefined number of images; and the processor can be operable to: select the predefined number of annotated X-ray images associated with a highest similarity level to the query X-ray image.

In some embodiments, the processor can be operable to determine the disease classification of a majority of annotated X-ray images within the set of annotated X-ray images; and assign the query X-ray image with the determined disease classification.

In some embodiments, the processor can be operable to assign the query X-ray image with one of a disease present identifier and a disease absent identifier.

In some embodiments, the disease present identifier can correspond to a disease type.

In some embodiments, each of the disease present identifier and the disease absent identifier can include a probability value.

In some embodiments, the disease present identifier can include a value indicating a presence of disease and the disease absent identifier can include a value indicating an absence of disease.

In some embodiments, the processor can be further operable to determine the similarity threshold based at least on a number of the one or more annotated X-ray images in the annotated image database and a disease type for which the query X-ray image is being diagnosed.

In some embodiments, the artificial neural network model can include a deep neural network model.

In some embodiments, the one or more annotated X-ray images can include one or more X-ray images associated with one of a disease present identifier and a disease absent identifier.

In some embodiments, the disease present identifier can include a value indicating a presence of disease and the disease absent identifier can include a value indicating an absence of disease.

In another broad aspect, a method of automatically identifying one or more diseased regions within a query X-ray image is disclosed herein. The method can involve splitting the query X-ray image into one or more query image portions. For each query image portion, applying an artificial neural network model to that query image portion to extract a query image portion feature vector representative of image characteristics of that query image portion; comparing the query image portion feature vector with one or more annotated image portion feature vectors associated with one or more annotated image portions to determine a similarity level between that query image portion and each annotated image portion; associating that query image portion with a set of annotated image portions based at least on the similarity level and a similarity threshold; and assigning that query image portion with a disease classification based at least on the disease classification of one or more annotated image portions. The method can involve identifying the one or more diseased regions within the query X-ray image based on one or more query image portions assigned with the disease classification associated with a disease present identifier.

In some embodiments, the method can further involve defining a set of related query image portions for each query image portion assigned the disease classification associated with the disease present identifier; for each related query image portion, applying the artificial neural network model to extract a related query image region feature vector representative of image characteristics of that related query image portion; comparing the related query image region feature vector with the one or more annotated image portion feature vectors associated with respective one or more annotated image portions to determine the similarity level between that related query image portion and each annotated image portion; associating that related query image portion with a set of annotated image portions based at least on the similarity level and the similarity threshold; and assigning that related query image portion with the disease classification based at least on the disease classification of one or more annotated image portions; and identifying the one or more diseased regions within the query X-ray image based on one or more related query image portions assigned with the disease classification associated with the disease present identifier.

In some embodiments, defining the set of related query image portions for each query image portion assigned the disease classification associated with the disease present identifier can involve splitting the query image portion into one or more related query image portions.

In some embodiments, defining the set of related query image portions for each query image portion assigned the disease classification associated with the disease present identifier can involve defining one or more related query image portions based on a predefined distance from a center of that query image portion, In some embodiments, the one or more related query image portions can include an overlapping portion with each other.

In another broad aspect, a system for automatically identifying one or more diseased regions within a query X-ray image is disclosed herein. The system can include a communication component and a processor in communication with the communication component. The communication component can provide access to one or more one or more annotated image portions via a network. The processor can be operable to, split the query X-ray image into one or more query image portions; for each query image portion, apply an artificial neural network model to that query image portion to extract a query image portion feature vector representative of image characteristics of that query image portion; compare the query image portion feature vector with one or more annotated image portion feature vectors associated with one or more annotated image portions to determine a similarity level between that query image portion and each annotated image portion; associate that query image portion with a set of annotated image portions based at least on the similarity level and a similarity threshold; and assign that query image portion with a disease classification based at least on the disease classification of one or more annotated image portions; and identify the one or more diseased regions within the query X-ray image based on one or more query image portions assigned with the disease classification associated with a disease present identifier.

In some embodiments, the processor can be further operable to define a set of related query image portions for each query image portion assigned the disease classification associated with the disease present identifier; for each related query image portion, apply the artificial neural network model to extract a related query image region feature vector representative of image characteristics of that related query image portion; compare the related query image region feature vector with the one or more annotated image portion feature vectors associated with respective one or more annotated image portions to determine the similarity level between that related query image portion and each annotated image portion; associate that related query image portion with a set of annotated image portions based at least on the similarity level and the similarity threshold; and assign that related query image portion with the disease classification based at least on the disease classification of one or more annotated image portions; and identify the one or more diseased regions within the query X-ray image based on one or more related query image portions assigned with the disease classification associated with the disease present identifier In some embodiments, the processor can be operable to split the query image portion into one or more related query image portions.

In some embodiments, the processor can be operable to define one or more related query image portions based on a predefined distance from a center of that query image portion.

In some embodiments, the one or more related query image portions can include an overlapping portion with each other.

An example non-transitory computer-readable medium including instructions executable on a processor can implement any one of the methods disclosed herein.

BRIEF DESCRIPTION OF THE DRAWINGS

Several embodiments will now be described in detail with reference to the drawings, in which:

FIG. 20A is table of an example dataset;

FIG. 20B is a table of another example dataset;

FIG. 21A is table illustrating example results obtained from using the dataset shown in FIG. 20A with an example system described herein;

FIG. 21B is table illustrating example results obtained from using the dataset shown in of FIG. 20B with an example system described herein;

FIG. 22A is a table illustrating another example results obtained from using the dataset shown in FIG. 20A in accordance with an example system described herein; and FIG. 22B is a table illustrating another example results obtained from using the dataset shown in FIG. 20B in accordance with an example system described herein.

Figure 1:
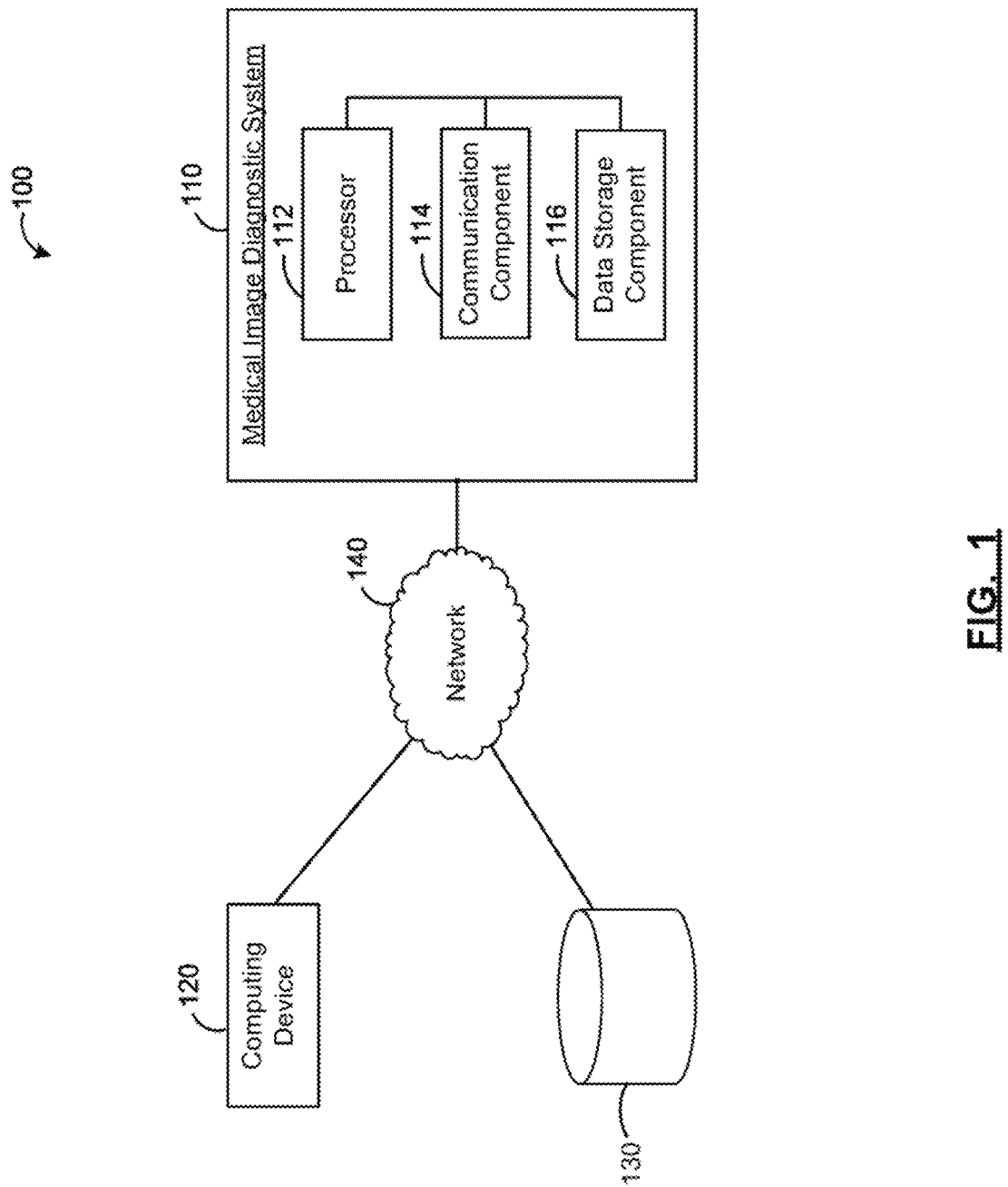
FIG. 1 is a block diagram of components interacting with an example medical image diagnostic system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The various embodiments described herein generally relate to methods (and associated systems configured to implement the methods) of generating both global-level features from an entire X-ray images and region-specific features from portions of the X-ray images and using the features for determining the presence of various conditions or diseases. For example, in some embodiments, region-specific features from chest X-ray images are generated to determine the presence of lung diseases such as, but not limited to, pneumothorax, pneumonia, COVID-19, and other chest conditions.

Pneumothorax (collapsed or dropped lung) is an emergency medical condition that occurs when air enters the pleural space, i.e. the space between the lungs and the chest wall, and can cause subsequent respiratory distress. Pneumothorax is generally a life-threatening condition that can be fatal, especially in critically ill patients. To reduce morbidity or patient death, early detection of pneumothorax can be crucial. Pneumothorax is typically detected on chest X-ray images by qualified radiologists.

However, the detection rate through visual inspection of the radiographs can be quite low. As well, there is a shortage of highly specialized radiologists. Hospital practices can result in long worklists of radiology images to be read, particularly those acquired overnight or without accompanying clinical suspicion of a significant problem. Therefore, there is a strong demand for automated detection systems to assist radiologists. For example, an automated method of screening chest X-rays and prioritizing studies with positive findings for rapid review may reduce the delay in diagnosing and treating pneumothorax.

For example, computer-implemented deep learning techniques, such as those involving the use of deep neural networks (DNN), can be applied for processing digital images. Example deep neural networks can include artificial neuron networks with at least five hidden layers to detect thoracic and/or lung diseases in chest X-ray images, such as but not limited to, pneumothorax. For example, CheXNet, a DNN with DenseNet121 architecture, has been trained to achieve radiologist-level detection of pneumonia. Some example deep-learning pneumothorax detection systems can involve applying localization methods, i.e. to pinpoint the exact location of certain thoracic diseases in an input chest X-ray image, and/or classification methods, i.e. to predict the presence of certain thoracic diseases in an input chest X-ray image.

Region localization systems can be hard to deploy, as large high-quality datasets with pixel-level labels are needed to train such systems. As a result, it can be expensive to obtain such large high-quality datasets since creating labels constitutes tedious manual work for radiologists. Image classification and search systems, on the other hand, can be relatively easier to be deployed as they work on the entire image with no pixel-level labels. For example, existing datasets, such as ChestX-ray14 dataset, CheXpert dataset, and MIMIC-CXR dataset, with a total number of more than half a million chest X-ray images with global-level (or entire image) labels are available. Leveraging such a large amount of labelled images, classification-based systems should not be difficult to train and deploy. However, there are some limitations with classification systems, such as they are limited to output a single probability to quantify the likelihood of the chest x-ray to contain a certain abnormality. This value, in many cases, may not be enough to explain the diagnosis. Despite the high accuracy generally reported for deep learning classifiers, they may not be useful in clinical practice as they typically compute a single probability, which may not be enough to explain the basis for diagnosis.

Diagnosis based on image search techniques can provide a probabilistic output as well as identification of similar cases from the past (e.g., cases diagnosed with similar morphology), hence allowing for a comparison of patient histories and treatment profiles. Diagnosis based on image searching techniques may enable a virtual or computational "second opinion" for diagnostic purposes and provide computerized explanations for the decision support.

The methods and systems disclosed herein can involve the use of image search based on deep features obtained from deep neural networks to detect various diseases in X-ray images (e.g., pneumothorax from chest X-ray images). The methods can involve using an image search as a classifier to tag available chest X-ray images with a feature vector. Given a chest X-ray image as input, at least some of the systems disclosed herein use majority voting of image search results as a classifier to determine whether pneumothorax is present in the input chest X-ray image. The corresponding reports and other clinical data of the top search results can also be used if available.

Reference is now made to FIG. 1, which illustrates a block diagram 100 of components interacting with a medical image diagnostic system 110. As shown in FIG. 1, the medical image diagnostic system 110 is in communication with a computing device 120 and an external data storage 130 via a network 140.

The medical image diagnostic system 110 includes a processor 112, a communication component 114, and a data storage component 116. The medical image diagnostic system 110 can be provided on one or more computer servers that may be distributed over a wide geographic area and connected via the network 140.

The processor 112, the communication component 114, and the data storage component 116 can be combined into a fewer number of components or can be separated into further components. The processor 112, the communication component 114, and the data storage component 116 may be implemented in software or hardware, or a combination of software and hardware.

The processor 112 operates to control the operation of the medical image diagnostic system 110. The processor 112 can initiate and manage the operations of each of the other components within the medical image diagnostic system 110. The processor 112 may be any suitable processors, controllers or digital signal processors that can provide sufficient processing power depending on the configuration, purposes and requirements of the medical image diagnostic system 110. In some embodiments, the processor 112 includes more than one processor with each processor being configured to perform different dedicated tasks.

The communication component 114 may include any interface that enables the medical image diagnostic system 110 to communicate with other devices and systems. In some embodiments, the communication component 114 can include at least one of a serial port, a parallel port or a USB port. The communication component 114 may also include at least one of an Internet, Local Area Network (LAN), Ethernet, Firewire, modem or digital subscriber line connection. Various combinations of these elements may be incorporated within the communication component 114.

For example, the communication component 114 may receive input from various input devices, such as a mouse, a keyboard, a touch screen, a thumbwheel, a track-pad, a track-ball, a card-reader, voice recognition software and the like depending on the requirements and implementation of the medical image diagnostic system 110.

The data storage component 116 can include RAM, ROM, one or more hard drives, one or more flash drives or some other suitable data storage elements such as disk drives, etc. Similar to the data storage component, the external data storage 130 can also include RAM, ROM, one or more hard drives, one or more flash drives or some other suitable data storage elements such as disk drives, etc.

The data storage component 116 and the external data storage 130 can also include one or more databases for storing information relating to the images, patient information, diagnostic information, etc.

The computing device 120 can include any networked device operable to connect to the network 140. A networked device is a device capable of communicating with other devices through a network such as the network 120. A network device may couple to the network 120 through a wired or wireless connection. Although only one computing device 120 is shown in FIG. 1, it will be understood that more computing devices 120 can connect to the network 140.

The computing device 120 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

The network 140 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), 557 signaling network, fixed line, local area network, wide area network, and others, including any combination of these, capable of interfacing with, and enabling communication between, the medical image diagnostic system 110, the computing device 120, and the external data storage 130.

Figure 2:
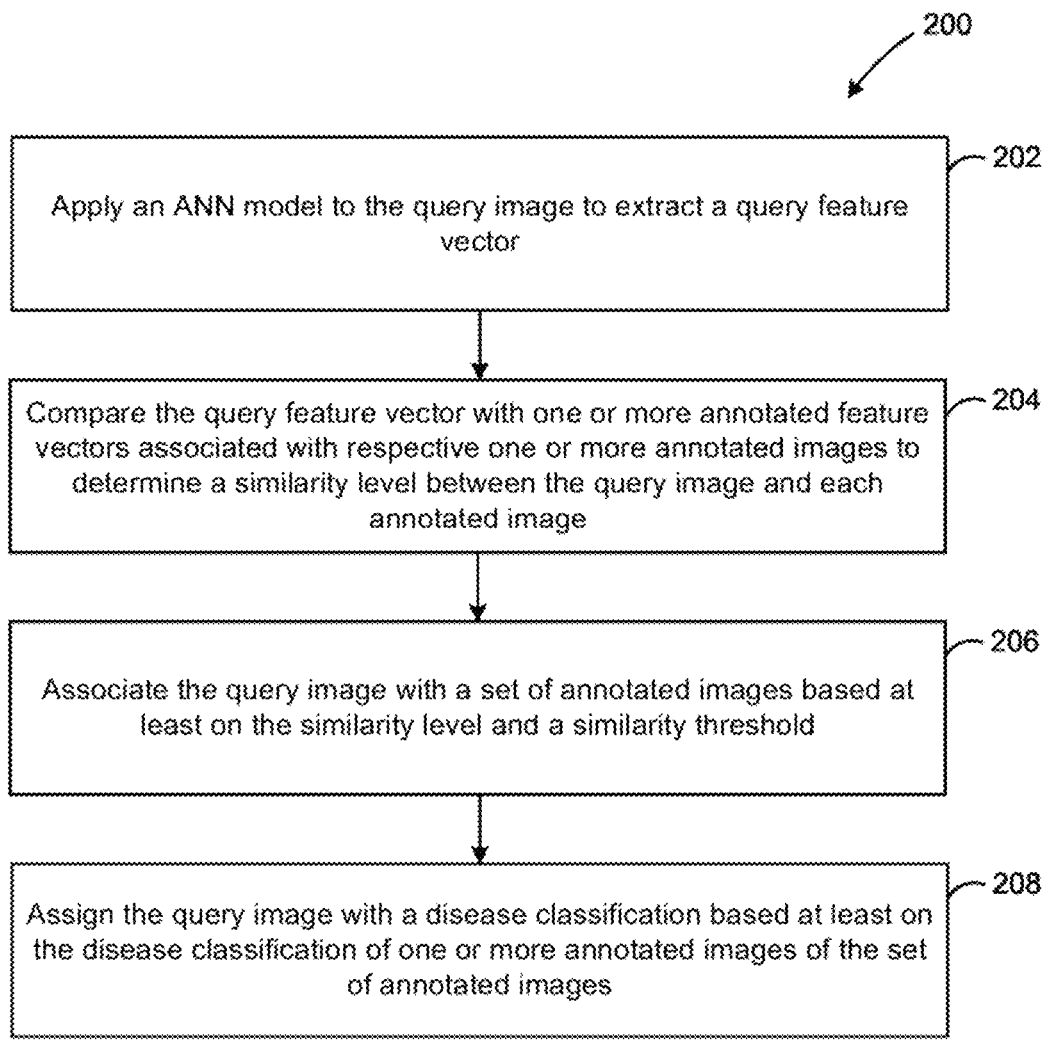
FIG. 2 is a flowchart of an example method for diagnosing a query X-ray image, in accordance with an example embodiment.

Referring now to FIG. 2, an example method 200 of diagnosing a query X-ray image is shown in a flowchart diagram. To assist with the description of the method 200, reference will be made simultaneously to FIG. 3A to FIG. 11. A medical image diagnostic system, such as medical image diagnostic system 110 having a processor 112 can be configured to implement method 200.

Figure 3A:
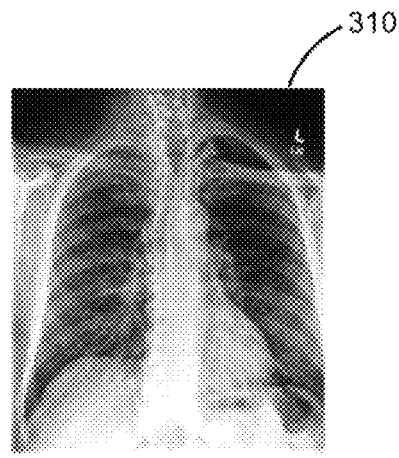
FIG. 3A is an example X-ray image.

Method 200 begins at 202. The processor 112 obtain a query X-ray image, such as example image 310 in FIG. 3A. Although example image 310 is shown in FIG. 3A as being a radiology image, and in particular, a chest X-ray image, the image 310 can be any type of image. The one or more query X-ray images can be obtained from a computing device 120, or an external data storage 130.

The processor 112 extracts a query feature vector from the query X-ray image. The query feature vector is representative of image characteristics of the query X-ray image. The query feature vector can be a vector with real value numbers. In some embodiments, the real value numbers of the query feature vector can also be referred to as deep features. The query feature vector can have a pre-determined dimension.

Furthermore, the pre-determined dimension of the query feature vector can be fixed. For example, a query feature vector can have a pre-determined, fixed dimension of 1,024.

Figure 4:
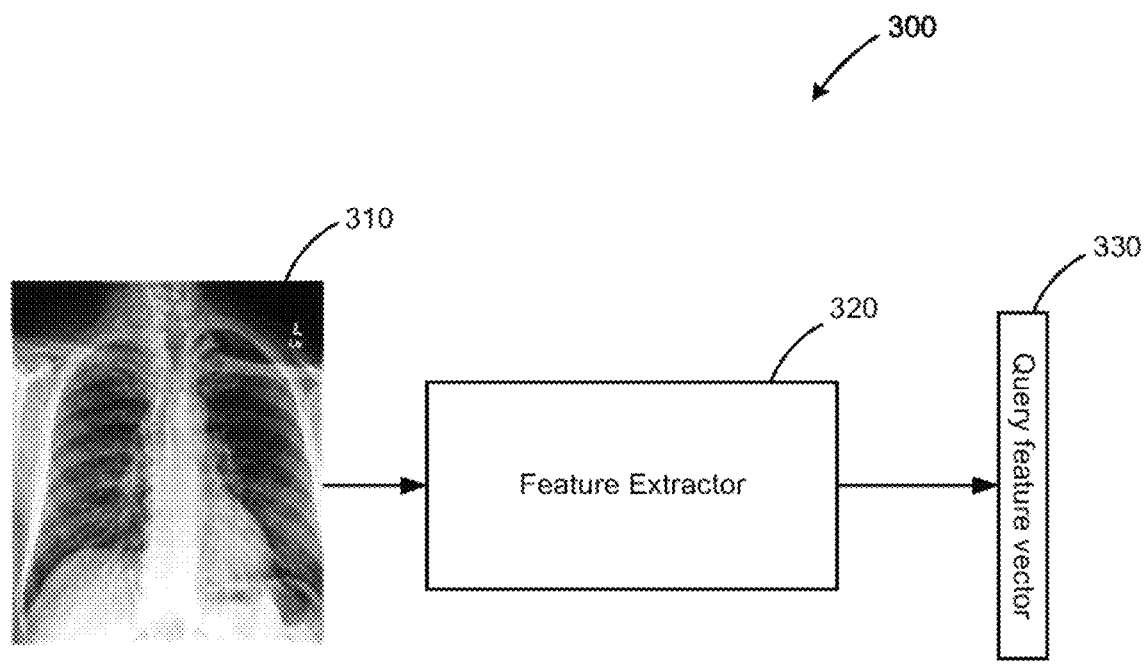
FIG. 4 is a diagram illustrating an example method of extracting a feature vector, in accordance with an example embodiment.

As shown in the example 300 of FIG. 4, a feature extractor 320 obtains a query feature vector 330 from the query X-ray image 310. The feature extractor 320 can be an artificial neural network (ANN) model. That is, the processor 112 can apply an artificial neural network (ANN) model to the query X-ray image 310 to extract the query feature vector 330. The artificial neural network model can be pre-trained. In some embodiments, the artificial neural network model can include a deep neural network model. The deep neural network model can include a convolutional neural network model. The deep neural network model can include a pooling (i.e., downsampling) or fully-connected layer before a classification layer. For example, the processor 112 can use a pre-trained or fine-tuned network architecture, such as but not limited to, a fine-tuned DenseNet121 topology, as a feature extractor to extract a feature vector with 1,024 dimensions.

In some embodiments, the processor 112 preprocesses the query X-ray image prior to applying the artificial neural network model to the query X-ray image. Preprocessing the query X-ray image can involve, but is not limited to, dividing or splitting the query X-ray image into one or more query image portions (also called sub-images). For example, the processor 112 can divide the query X-ray image substantially equally to generate a first and a second query image portion.

Figure 3B:
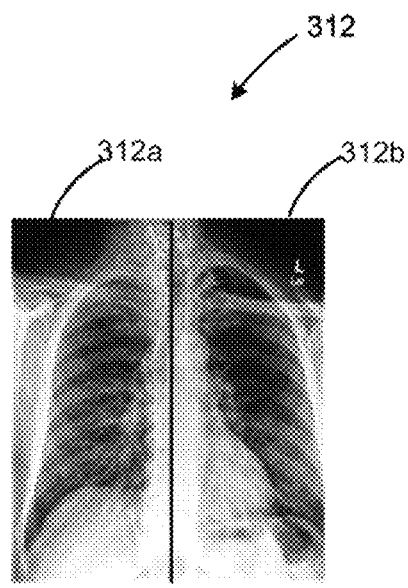
FIG. 3B is the X-ray image of FIG. 3A divided into one or more example image portions.

As shown in the example of FIG. 3B, the processor 112 divides the query X-ray image 310 into a first query image portion 312*a* and a second query image portion 312*b* (collectively referred to as query image portions 12). In the example of FIG. 3B, the query X-ray image 310 is a chest X-ray image, and the first and the second query image portions 12 correspond to a right-side of the chest and a left-side of the chest, respectively.

Figure 5A:
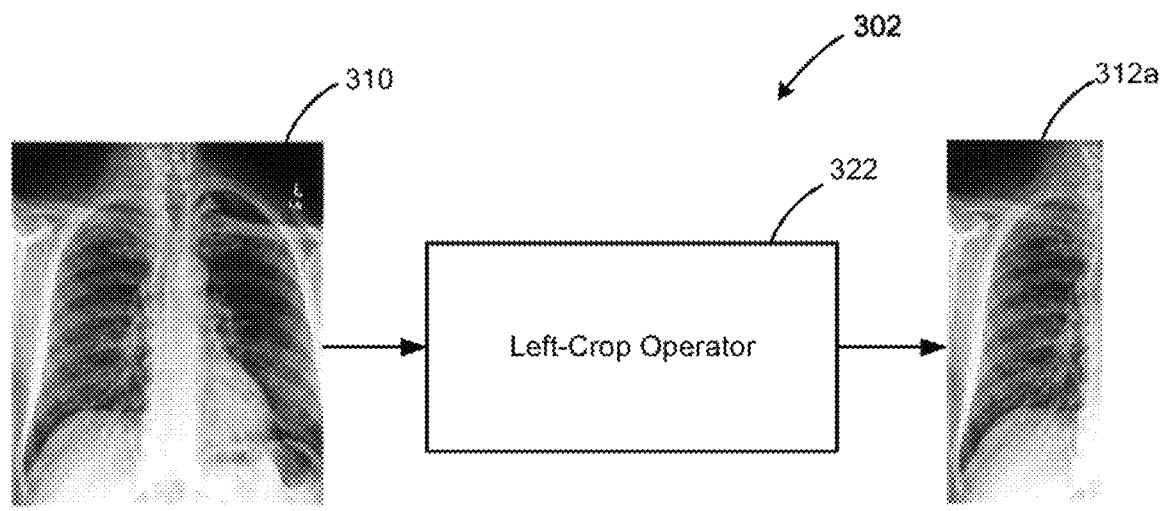
FIG. 5A is a diagram illustrating an example method of generating an image portion of the example X-ray image of FIG. 3A, in accordance with an example embodiment.

As shown in the example 302 of FIG. 5A, the processor 112 applies a left-crop operator 322 to obtain a first query image portion 312*a* corresponding to the right-side of the query X-ray image 310 (i.e., a left portion of the chest X-ray image 10). The left-crop operator 322 generates a cropped version 312*a* of the query X-ray image 310 so that only the left portion of the query X-ray image 310 remains. Likewise, in the example 304 of FIG. 5B, the processor 112 applies a right-crop operator 324 to obtain a second query image portion 312*b* corresponding to the left-side of the query X-ray image 310 (i.e., a right portion of the chest X-ray image 12). The right-crop operator 324 generates a cropped version 312*b* of the query X-ray image 310 so that only the right portion of the query X-ray image 310 remains.

In other embodiments, the first and the second query image portions 12 correspond to a top portion and a bottom portion. While only two query image portions 312*a*, 312*b* are shown in FIG. 3B, the processor 112 can divide the query X-ray image 310 into more substantially equal query image portions. For example, the processor 112 can divide the query X-ray image 310 into 16 equal query image portions (e.g., 4×4). In some embodiments, the processor 112 can divide the query X-ray image 310 into four equal query image portions (e.g., 2×2) or nine equal query image portions (e.g., 3×3). The first query image portion 312*a* in the example shown in FIG. 3B does not overlap with the second query image portion 312*b*. In some embodiments, query image portions overlap one or more other query image portions.

In some embodiments, preprocessing the query X-ray image 310 also involves rotating and/or flipping one or more of the query image portions. For example, a first query image portion can retain the orientation of the query X-ray image while a second query image portion can be flipped, rotated, or both flipped and rotated. As shown in the example 306 of FIG. 5C, the second query image portion 312*b* corresponding to the left-side of the lung is horizontally flipped to provide a horizontally flipped version 314*b* of the second query image portion 312*b*. That is, the processor 112 applies a horizontal-flip operator 326 to the second query image portion 312*b* about the vertical axis of the query X-ray image 310.

Figure 5B:
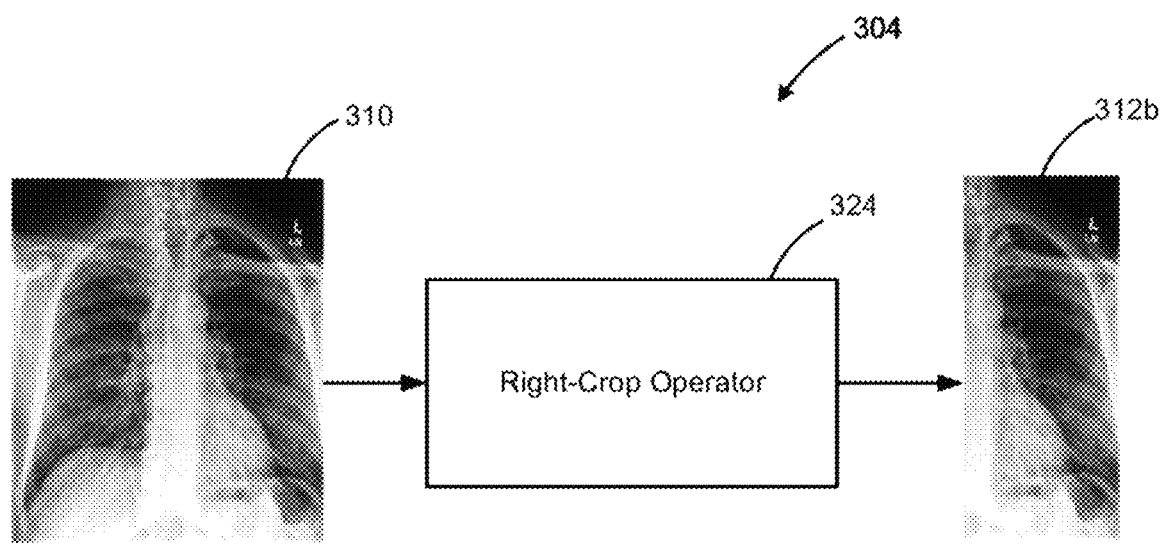
FIG. 5B is a diagram illustrating another example method of generating an image portion of the example X-ray image of FIG. 3A, in accordance with an example embodiment.
Figure 5C:
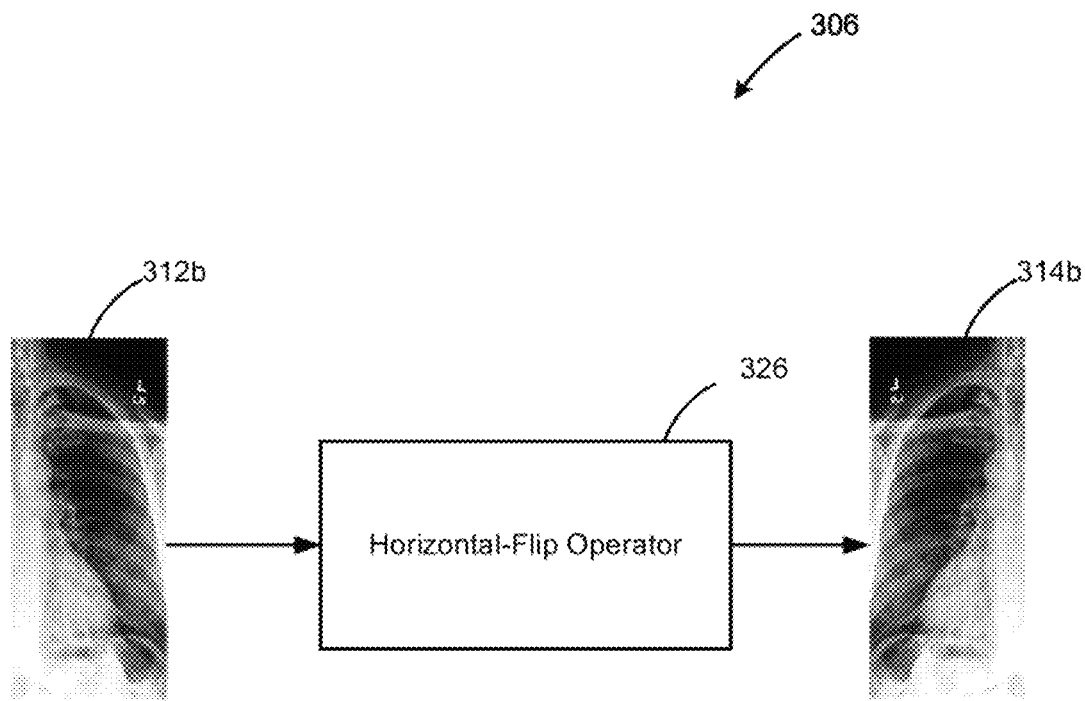
FIG. 5C is a diagram illustrating an example method of horizontally flipping the example image portion of FIG. 5B, in accordance with an example embodiment.

While only a left-crop operator 322, a right-crop operator 324, and a horizontal-flip operator 326 are shown in FIG. 5A to 5C, other image operators are possible.

For example, version 314*b* of the second query image portion 312*b* is shown as being horizontally flipped in FIG. 5C. In other embodiments, one or more query image portions are vertically flipped (i.e., flipped about the horizontal axis of the query X-ray image 10). Furthermore, when a first query image portion and a second query image portion correspond to a top portion and a bottom portion of a query X-ray image respectively, the first query image portion can retain the orientation of the query X-ray image while the second query image portion can be vertically flipped. As well, one or more query image portions can be rotated in a clockwise or a counterclockwise direction.

In some embodiments, the processor 112 applies the artificial neural network model to each query image portion of the one or more query image portions to generate a respective query image portion feature vector representative of the image characteristics of that query image portion. The processor 112 combines the respective query image portion feature vectors to generate the query feature vector for the query X-ray image.

Figure 6:
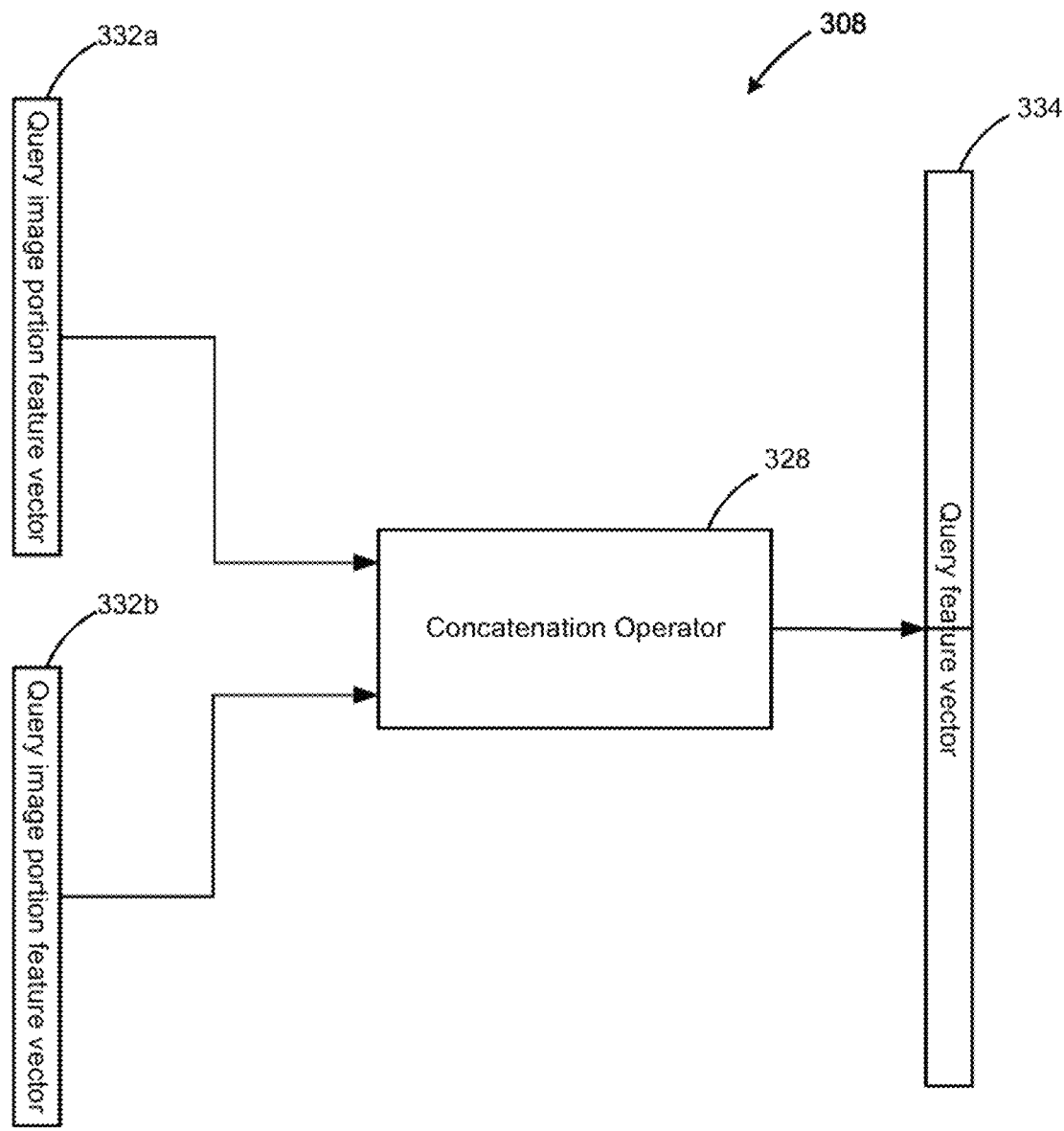
FIG. 6 is a diagram illustrating an example method of concatenating feature vectors, in accordance with an example embodiment.

As shown in the example 308 of FIG. 6, the processor 112 applies the artificial neural network model to the first query image portion 312*a* to obtain a first query image portion feature vector 332*a* representative of the image characteristics of the first query image portion 312*a*. As well, the processor 112 applies the artificial neural network model to the second query image portion 312*b* to obtain a second query image portion feature vector 332*b* representative of the image characteristics of the second query image portion 312*b*. The processor 112 combines the first query image portion feature vector 332*a* and the second query image portion feature vector 332*b* to generate the query feature vector 334 for the query X-ray image. Each of the first query image portion feature vector 332*a*, the second query image portion feature vector 332*b*, and the query feature vector 334 can be vectors with real value numbers.

While FIG. 6 shows the query feature vector 334 as corresponding to the combination of the first query image portion feature vector 332*a* and the second query image portion feature vector 332*b* as being a concatenation, other combinations are possible.

In some embodiments, the processor 112 applies the artificial neural network model to the query X-ray image to generate an entire image query feature vector representative of the image characteristics of the query X-ray image. The processor 112 combines the respective query image portion feature vectors and the entire image query feature vector to generate the query feature vector.

Figure 7:
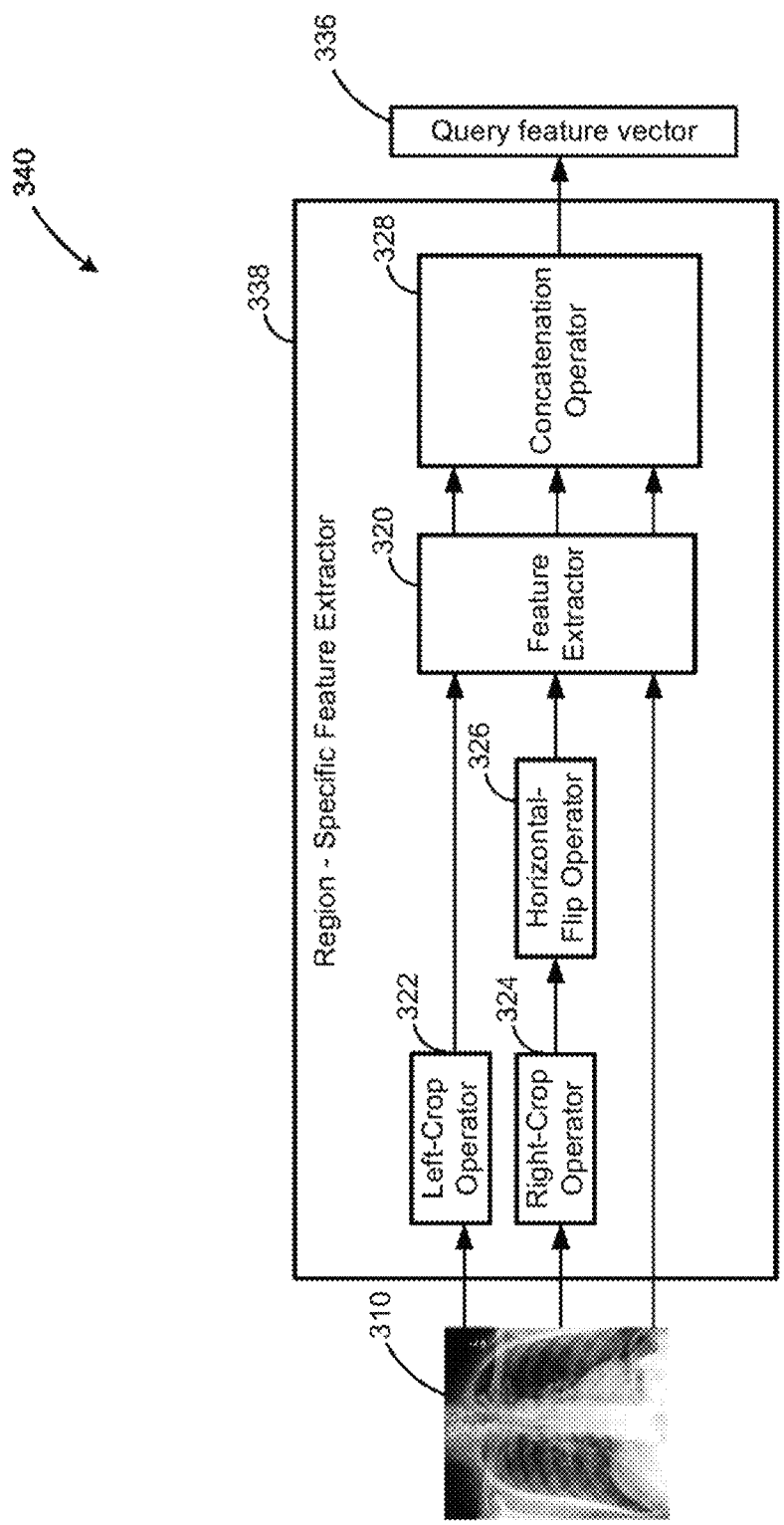
FIG. 7 is a diagram illustrating another example method of extracting a feature vector, in accordance with an example embodiment.

As shown in the example 340 of FIG. 7, the processor 112 operates a region-specific feature extractor 338 to process the query X-ray image 310. In this example embodiment, the processor 112 provides the query X-ray image 310 to an image operator, such as the left-crop operator 322 of FIG. 5A, to generate a first query image portion 312a (not shown in FIG. 7). The processor 112 then provides the first query image portion 312a to the feature extractor 320 to obtain a first query image portion feature vector 332a (not shown in FIG. 7) representative of the image characteristics of the first query image portion 312a.

The processor 112 also provides the query X-ray image 310 to another image operator, such as the right-crop operator 324 of FIG. 5B, to generate the second query image portion 312b (not shown in FIG. 7). The processor 112 then provides the second query image portion 312b to another image operator, such as the horizontal-flip operator 326 of FIG. 5C, to generate a version 314b (not shown in FIG. 7) of the second query image portion 312b. The processor 112 then provides the version 314b of the second query image portion 312b to the feature extractor 320 to obtain a second query image portion feature vector 332b (not shown in FIG. 7) representative of the image characteristics of the second query image portion 312b.

The processor 112 also provides the query X-ray image 310 directly to the feature extractor 320 to obtain an entire image query vector 330 representative of the image characteristics of the query X-ray image 310.

The processor 112 provide the entire image query feature vector 330, the first query image portion feature vector 332a, and the second query image portion feature vector 332b to a concatenation operator, such as the concatenation operator 328 of FIG. 6, to generate the query feature vector 36 for the query X-ray image 310. That is, the processor 112 applies a region-specific feature extractor 338 to obtain the query feature vector 336. Each of the first query image portion feature vector 332a, the second query image portion feature vector 332b, the entire image query feature vector 330, and the query feature vector 336 can be vectors with real value numbers.

Although the feature extractor 320 is shown as one component in FIG. 7, it will be understood that the feature extractor 320 can be provided as two or more components with a separate feature extractor 320 for each of the one or more query image portions 312 and the entire query X-ray image 310. In some embodiments, the region-specific feature extractor 338 includes more or fewer image operators, and/or different structure of image operators than is shown in FIG. 7. Furthermore, although the feature extractors 320 and 338 are shown to extract a feature vector for an entire query image or query image portion, the feature extractors 320 and 338 can extract a feature vector for one or more regions of a query image.

Figure 8:
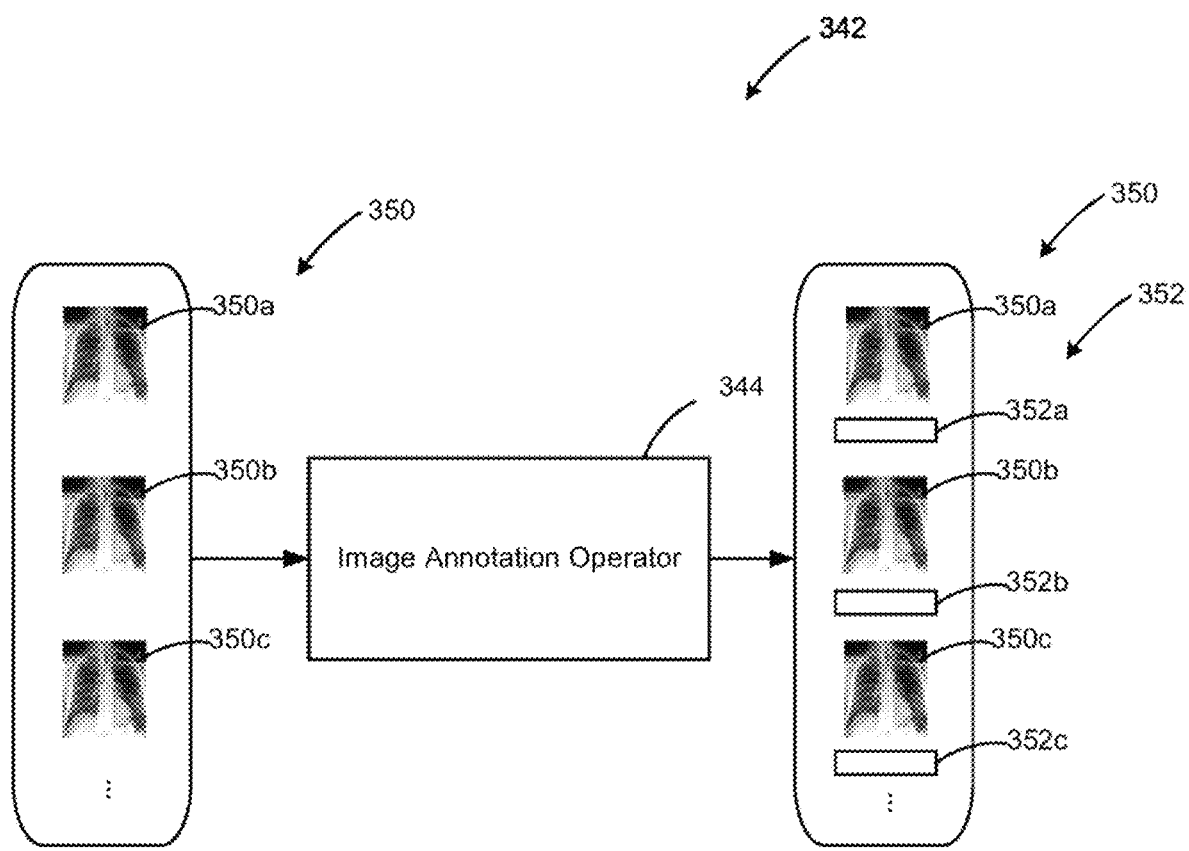
FIG. 8 is a diagram illustrating an example method of annotating one or more X-ray images, in accordance with an example embodiment.

In some embodiments, the processor 112 annotates the query X-ray image 310 with the query feature vector 330, 334, or 336. Furthermore, the processor 112 can annotate one or more X-ray images stored in an image database, such as the data storage component 116 or the external data storage 130. As shown in the example 342 of FIG. 8, the processor 112 applies an image annotation operator 344 to annotate each of one or more query X-ray images 350a, 350b, and 350c (collectively referred to as one or more query X-ray images 350) with a respective query feature vector 352a, 352b, and 352c (collectively referred to as one or more query feature vectors 352). The feature vectors 352 can be stored in the image database. Although only three images are shown in FIG. 8, it will be understood that query feature vectors can be stored for fewer or more images.

The query feature vectors 352 can be obtained from any methods and systems described herein, including example 300 of FIG. 4, example 308 of FIG. 6, and example 340 of FIG. 7. Furthermore, although each image 350 is shown with only one query feature vector 352 in FIG. 8, it will be understood that the images can be annotated with more query feature vectors. For example, each image can be annotated with a first query feature vector and a second query feature vector. The first query feature vector can be obtained from the entire image, such as example feature extractor 320 of FIG. 4, and the second query feature vector can be obtained from one or more query image portions, such as example 308 of FIG. 6.

Figure 9A:
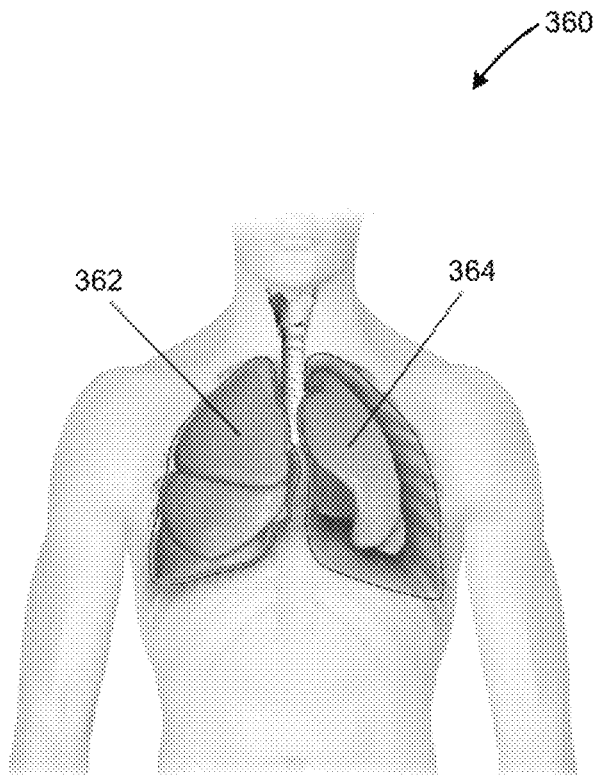
FIG. 9A is an illustration of an example lung exhibiting pneumothorax.

In some embodiments, the one or more annotated X-ray images are associated with one of a disease present identifier and a disease absent identifier (herein referred to as a disease present/absent identifier). The disease present/absent identifiers can be stored with the X-ray images in an image database, such as the data storage component 116 or the external data storage 130. In some embodiments, the disease present/absent identifier correspond to a disease type. For example, the disease type can be pneumonia or pneumothorax. An example illustration 360 of pneumothorax (obtained from Blausen.com staff (2014), "Medical gallery of Blausen Medical 2014". WikiJournal of Medicine 1 (2). DOI: 10.15347/wjm/2014.010. ISSN 2002-4436) is shown In FIG. 9A, in which the right lung 362 is normal and the left lung 364 is collapsed.

In some embodiments, the one or more annotated X-ray images are associated with a disease vector. The disease vector can include a vector of disease present identifiers, disease absent identifiers, or both disease present identifiers and disease absent identifiers. Each disease present/absent identifier can correspond to a disease type.

Figure 9B:
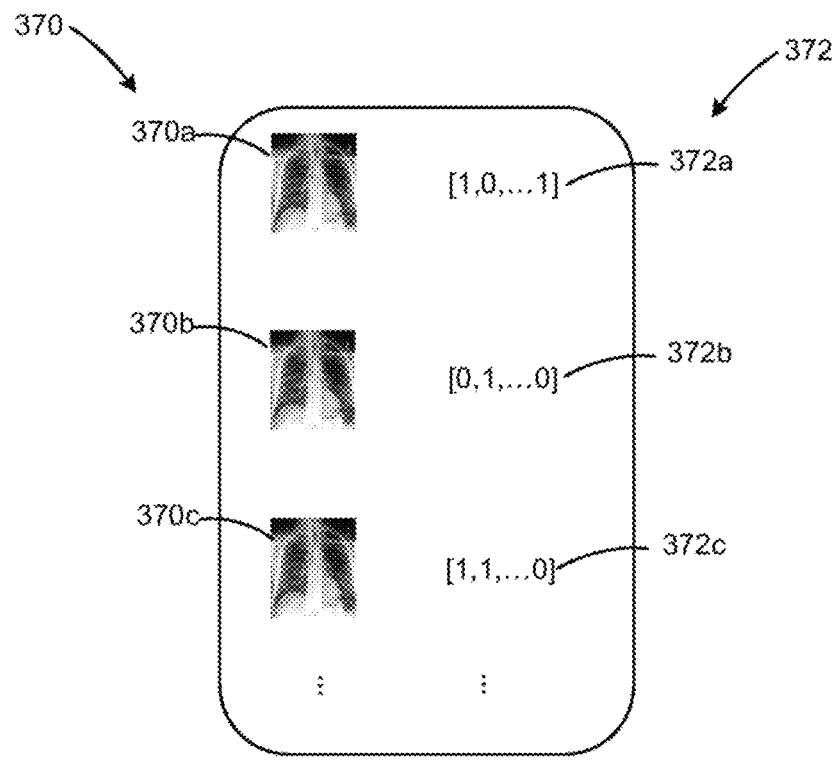
FIG. 9B is an example of annotated X-ray images with disease present/absent identifiers, in accordance with an example embodiment.

FIG. 9B shows example annotated X-ray images 370a, 370b, and 370c (collectively referred to as one or more annotated X-ray images 370). Each annotated X-ray image 370 is associated with a respective disease vector 372a, 372b, and 372c (collectively referred to as one or more disease vectors 372).

Figure 9C:
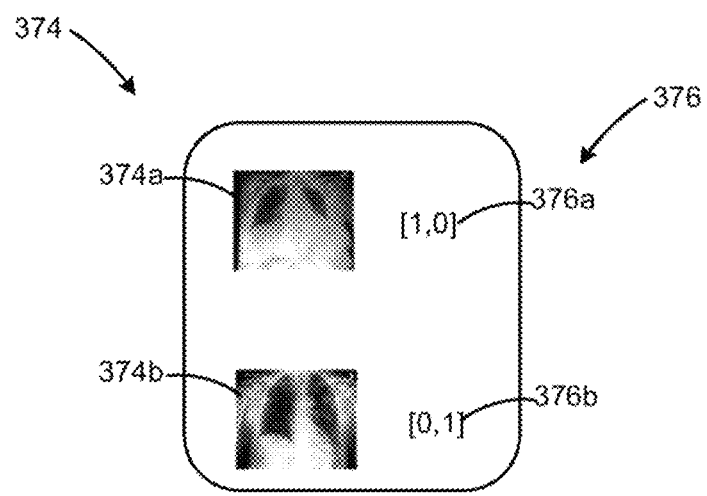
FIG. 9C is another example of annotated X-ray images with disease present/absent identifiers, in accordance with an example embodiment.

As shown in the example of FIG. 9C, each of annotated X-ray images 374a and 374b (collectively referred to as the annotated X-ray images 374a) are associated with a respective disease vector 376a and 376c (collectively referred to as one or more disease vectors 376). In the example of FIG. 9C, the disease vectors 376 include a first and second disease present identifiers that correspond to pneumonia and pneumothorax, respectively. For example, annotated X-ray image 374a exhibits pneumonia, which is indicated by the first disease present identifier of the disease vector 376a having a value of 1, and does not exhibit pneumothorax, which is indicated by the second disease present identifier of the disease vector 376a having a value of 0.

In contrast, example annotated X-ray image 374b does not exhibit pneumonia, which is indicated by the first disease present identifier of the disease vector 376b having a value of 0, and exhibits pneumothorax, which is indicated by the second disease present identifier of the disease vector 376b having a value of 1. Although the disease vectors 376 in FIG. 8B are shown to include only two disease present identifiers corresponding to two disease types, the disease vectors 376 can include fewer or more disease present identifiers corresponding to few or more disease types. Furthermore, although disease present identifiers are shown in FIG. 9C, it will be understood that the disease vectors 376 can include one or more disease absent identifiers.

Figure 10:
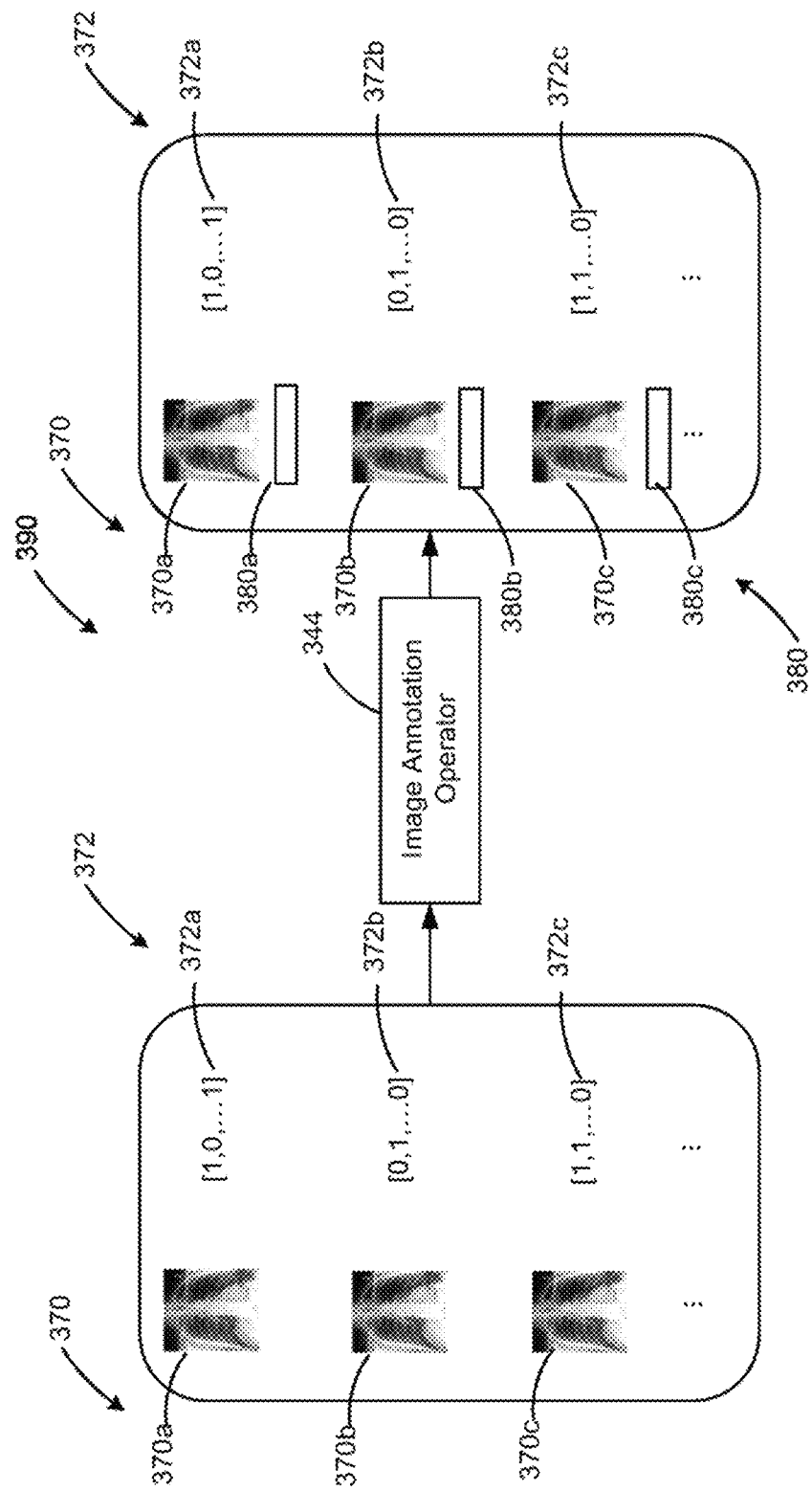
FIG. 10 is a diagram illustrating another example method of annotating one or more X-ray images, in accordance with an example embodiment.

Similar to example 342 of FIG. 8, example 390 of FIG. 10 shows that the processor 112 applies an image annotation operator 344 to annotate each of one or more annotated X-ray images 370a, 370b, and 370c (collectively referred to as one or more annotated X-ray images 370) of an image database, such as the data storage component 116 or the external data storage 130, with a respective feature vector 380a, 380b, and 380c (collectively referred to as one or more feature vectors 380). The feature vectors 380 can be stored with the X-ray images 370 in the image database.

As shown in FIG. 10, the annotated X-ray images 370 are associated with both feature vectors 380 and disease vectors 372. Although annotated X-ray images 370 are shown as being associated with feature vectors 380 and disease vector 372, it will be understood that the annotated X-ray images 370 can be further annotated. For example, the annotated X-ray images 370 can be associated with clinical and diagnostic reports.

In some embodiments, the disease present/absent identifier includes a probability value that corresponds to whether image characteristics of the annotated X-ray image indicate a presence or absence of disease. For example, the disease present identifier includes a value indicating a probability of the presence of disease while the disease absent identifier includes a value indicating a probability of the absence of disease. The probability value can be a real value number. Although the disease present/absent identifiers of the disease vectors 372 and 376 are shown as being integer values in FIG. 9B, FIG. 9C, and FIG. 10, it will be understood that the disease present/absent identifiers can be real values.

Figure 11:
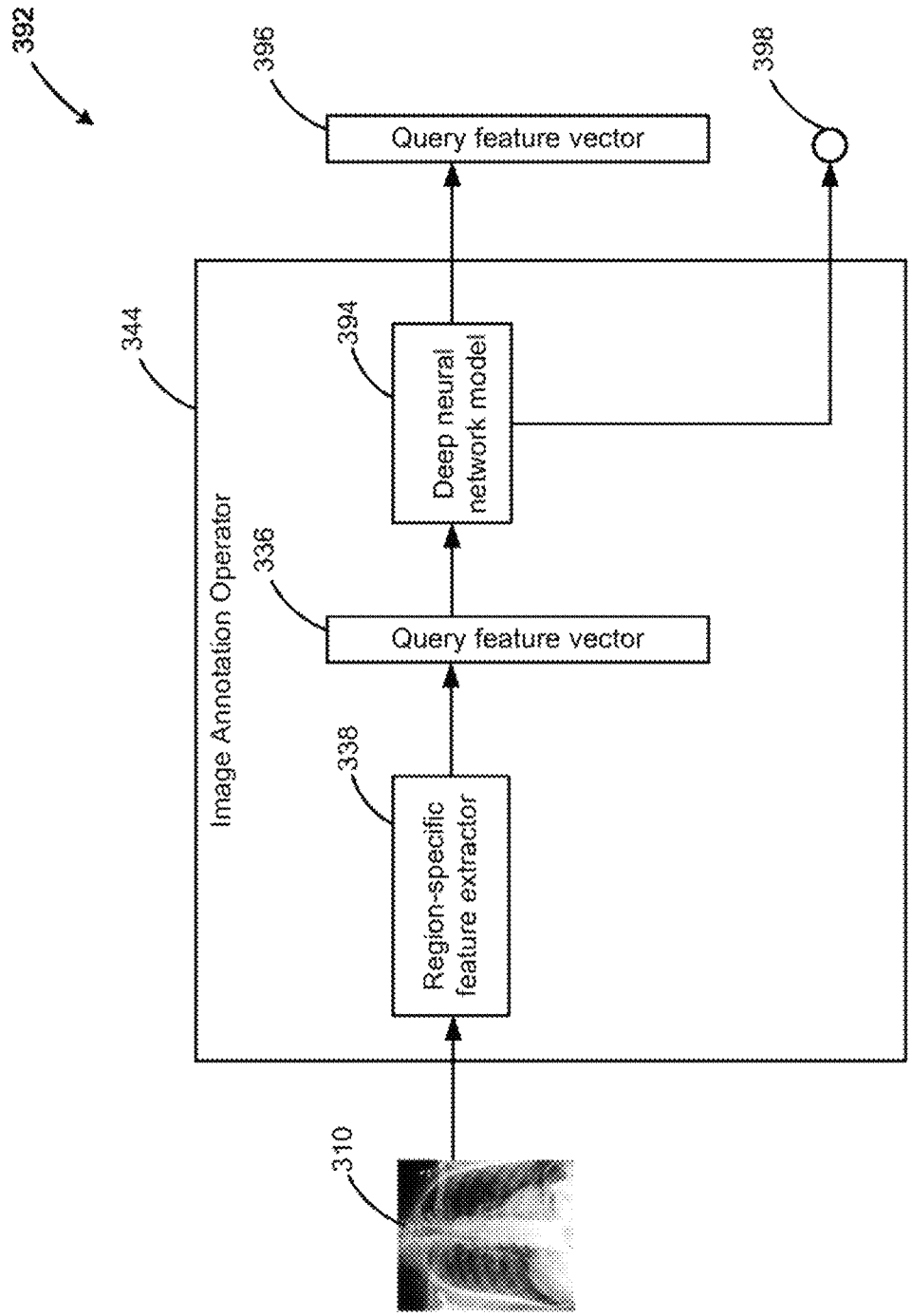
FIG. 11 is a diagram illustrating another example method of annotating one or more X-ray images, in accordance with an example embodiment.

As shown in the example 392 of FIG. 11, the processor 112 applies an image annotation operator 344 to annotate the query X-ray images 310 of an image database, such as the data storage component 116 or the external data storage 130, with a respective query feature vector 336, a query disease present/absent identifier 398, or both a query feature vector 336 and a query disease present/absent identifier 398. The processor 112 applies a feature extractor, such as region-specific feature extractor 338, to obtain the query feature vector 336. After obtaining the query feature vector 336, the processor 112 applies an artificial neural network model, such as deep neural network model 394, to generate the query feature vector 396 and a query disease present/absent identifier 398. The query feature vector 396 and/or query disease present/absent identifier 398 can be stored with the X-ray image 310 in an image database. In some embodiments, the query feature vector 396 is the query feature vector 336. In some embodiments, the features of query feature vector 336 is compressed to provide query feature vector 396. That is, the dimensions of query feature vector 396 can be smaller than the dimensions of query feature vector 336.

Although FIG. 11 shows the query feature vector 336 being generated by the region-specific feature extractor 338, it will be understood that the query feature vector 336 can be obtained from any methods and systems described herein, including example 300 of FIG. 4, example 308 of FIG. 6, and example 340 of FIG. 7.

In some embodiments, for an annotated X-ray image 370 having one or more query image portions, each disease present/absent identifier of the disease vector corresponds to the one or more query image portions of the annotated X-ray image. Furthermore, the disease vector can be an array with each disease present/absent identifier corresponding to the one or more query image portions and a disease type.

Returning now to FIG. 2, at 204, the processor 112 compares the query feature vector obtained at 202 with one or more feature vectors associated with respective one or more annotated X-ray images to determine a similarity level between the query X-ray image 310 and each annotated X-ray image of the one or more annotated X-ray images.

The processor 112 can obtain the one or more annotated feature vectors from an annotated image database, such as the data storage component 116 or the external data storage 130. The one or more annotated X-ray images can also be stored in the annotated image database.

Figure 12:
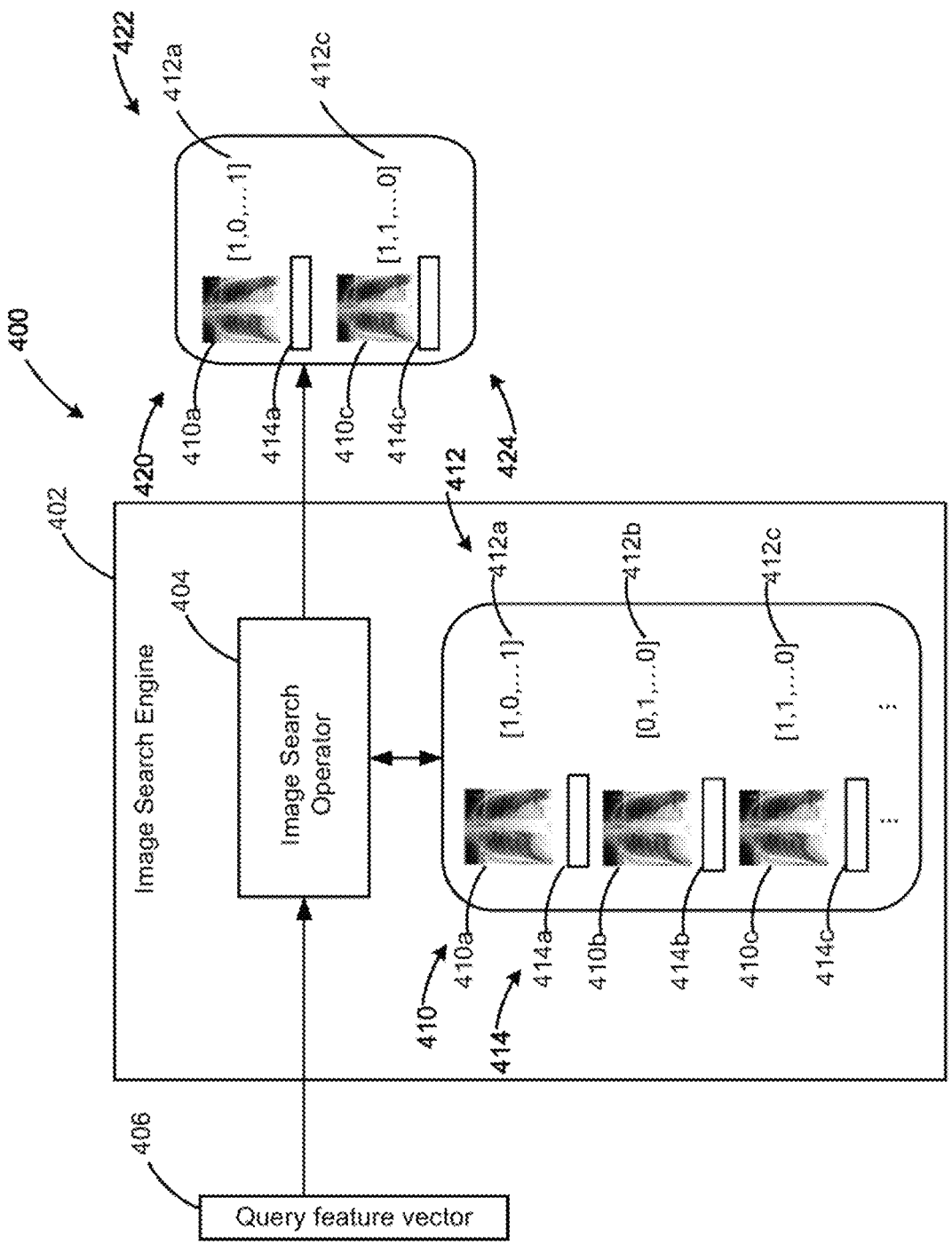
FIG. 12 is a diagram illustrating an example method of searching one or more images, in accordance with an example embodiment.

As shown in the example 400 of FIG. 12, a query feature vector, such as query feature vector 406, can correspond to the query X-ray image 310 (not shown in FIG. 12). Based on the query feature vector 406, the processor 112 applies an image search engine 402 to obtain one or more annotated feature vectors 414a, 414b, and 414c (collectively referred to as annotated feature vectors 414) that are associated with respective annotated X-ray images 410a, 410b, and 410c (collectively referred to as one or more annotated X-ray images 410). The one or more annotated X-ray images 410 are also associated with respective annotated disease vectors 412a, 412b, and 412c (collectively referred to as one or more annotated disease vectors 412). The one or more annotated disease vectors 412 can also be stored in the annotated image database. Although the disease present/absent identifiers of the disease vectors 412a, 412b, and 412c are shown as being integer values in FIG. 12, it will be understood that the disease present/absent identifiers can be real values.

The processor 112 applies an image search operator 404 to determine the similarity level between the query feature vector 406 and the annotated feature vectors 414 of each annotated X-ray image 410. In some embodiments, the processor 112 determines the similarity level by applying a distance transform to the query feature vector 406 and each annotated feature vector 414. The processor 112 assigns a similarity level to the query X-ray image, such as query X-ray image 310 (not shown in FIG. 11), that is based on a distance generated from applying the distance transform.

The similarity level can increase with shorter distances between the query feature vector 406 and the annotated feature vector 414. For example, the processor 112 can apply a distance transform by determining a Euclidean distance between the query feature vector 406 and each annotated feature vector 414. Other methods for applying a distance transform and comparing the query feature vector 406 with the one or more annotated feature vectors 414 are possible.

Returning now to FIG. 2, at 206, the processor 112 associates the query X-ray image with a set of annotated X-ray images based at least on the similarity level and a similarity threshold.

In some embodiments, the processor 112 sorts the one or more annotated feature vectors 414 by the similarity level to determine the set of annotated X-ray images 410a, 410c (collectively referred to as the set of annotated X-ray images 420) that satisfy the similarity threshold.

The similarity threshold can include a predefined number of images. The processor 112 selects the predefined number of annotated X-ray images associated with a highest similarity level to the query X-ray image 410. For example, the processor 112 of FIG. 12 determines that the predefined number of images is two images and that the similarity level between the query feature vector 406 and the annotated feature vector 414b is the lowest. As such, the processor 112 excludes the annotated X-ray image 410b from the set of annotated X-ray images associated with the query X-ray image corresponding to the query feature vector 406.

The processor 112 include the annotated X-ray images 410a and 410c in the set of annotated X-ray images 420 associated with the query X-ray image corresponding to the query feature vector 406. Thus, the set of annotated X-ray images 420 is a subset of the one or more annotated X-ray images 410 obtained from the annotated image database by the image search engine 402.

Each image 410a, 410c of the set of annotated X-ray images 420 are associated with a respective annotated feature vector 414a, 414c (collectively referred to as the set of annotated feature vectors 424) and a respective annotated disease vector 412a, 412c (collectively referred to as the set of annotated disease vectors 422). Although only two X-ray images 410a and 410c are shown in the set of annotated X-ray images 420, it will be understood that the set of annotated X-ray images 420 can include fewer or more annotated X-ray images.

In another example, the similarity threshold can include a predefined similarity level. The processor 112 selects the annotated X-ray images associated with the query X-ray image having a similarity level that is greater than the predefined similarity level. For example, the processor 112 of FIG. 12 determines that the similarity level between the query feature vector 406 and the annotated feature vector 414b is less than the predefined similarity level. As such, the processor 112 excludes the annotated X-ray image 410b from the set of annotated X-ray images associated with the query X-ray image corresponding to the query feature vector 406. The processor 112 includes the annotated X-ray images 410a and 410c in the set of annotated X-ray images 420 associated with the query X-ray image corresponding to the query feature vector 406.

In some embodiments, the similarity threshold includes both a predefined number of images and a predefined similarity level. That is, the processor 112 select the predefined number of annotated X-ray images associated the query X-ray image having a similarity level that is greater than the predefined similarity level.

The processor 112 determines the similarity threshold based at least on a number of the one or more annotated X-ray images in the annotated image database. For example, the similarity threshold can be higher when there are more annotated X-ray images, and the similarity threshold can be lower when there are less annotated X-ray images.

The processor 112 can determine the similarity threshold based at least on a disease type for which the query X-ray image is being diagnosed. For example, the similarity threshold can be higher for a particular disease type while the similarity threshold can be lower for other disease types.

At 208, the processor 112 assigns the query X-ray image with a disease classification based at least on the disease classification of one or more annotated X-ray images of the set of annotated X-ray images.

In some embodiments, the processor 112 determines the disease classification of a majority of annotated X-ray images within the set of annotated X-ray images and assign the query X-ray image with the determined disease classification. In some embodiments, the disease classification assigned to the query X-ray image is one of a disease present identifier and a disease absent identifier.

For example, continuing with example 400, the processor 112 determines that both annotated X-ray images 410a and 410c within the set of annotated X-ray images 420 exhibit disease and assigns a disease present identifier to the query X-ray image 310 corresponding to query feature vector 406.

In some embodiments, the disease classification includes a disease type. For example, continuing with example 400, the processor 112 determines that both annotated X-ray images 410a and 410c within the set of annotated X-ray images exhibit pneumothorax and assign a pneumothorax disease classification to the query X-ray image 310 corresponding to the query feature vector 406.

The processor 112 can determine whether there is a majority of annotated X-ray images of the set of annotated X-ray images based at least on a majority threshold. The processor 112 selects a subset of the annotated X-ray images of the set of annotated X-ray images having a common or same classification and determines whether the subset satisfies the majority threshold. The majority threshold can include a predefined number of images. The majority threshold can include a predefined proportion of images. In some embodiments, the majority threshold includes both a predefined number of images and a predefined proportion of images.

For example, the processor 112 can identify a subset of 45 annotated X-ray images from a set of 80 annotated X-ray images having a common classification. For a majority threshold of 40 images, the processor 112 determines that the size of the subset is greater than the majority threshold and the subset is a majority of annotated X-ray images. In contrast, for a majority threshold of 60% of images, the processor 112 determine that size of the subset corresponds to 56% of images and the subset is not a majority of annotated X-ray images.

The processor 112 can identify one or more annotated X-ray images of the set of annotated X-ray images 420 as a subset having a common or same classification based at least on the probability value of the disease present/absent identifiers 422 of the set of annotated X-ray images and a classification threshold.

The classification threshold can include a predefined probability value. For example, the processor 112 selects the annotated X-ray images having a probability value of the disease present identifier that is greater than the predefined probability value. The processor 112 determines that the probability value of the disease present identifier for annotated X-ray image 410a is greater than the predefined probability value. As such, the processor 112 includes the annotated X-ray image 410a in the subset having a disease present classification. In contrast, the processor 112 can determine that the probability value of the disease present identifier of annotated X-ray image 410c is less than the predefined probability value. As such, the processor 112 excludes the annotated X-ray image 410c from the subset of annotated X-ray images having a disease present classification.

The disease classification can include a probability value that corresponds to whether image characteristics of the query X-ray image indicate a presence or absence of disease, respectively. The probability value can be a real value or an integer value.

The processor 112 can generate the probability value of the disease classification based on the similarity threshold used to associate the query X-ray image with the set of annotated images at 206. For example, the similarity threshold can include a predefined number of images, such as a value of k images. If half of the set of annotated X-ray images are classified as exhibiting pneumothorax, the processor 112 can classify the query X-ray image 310 as exhibiting pneumothorax with a probability value of [k/2]/k.

It will be understood that other similarity thresholds and majority thresholds are possible and can be selected depending on various factors, such as, but not limited to, the amount of available data, the type of disease, and the type of study.

Figure 13:
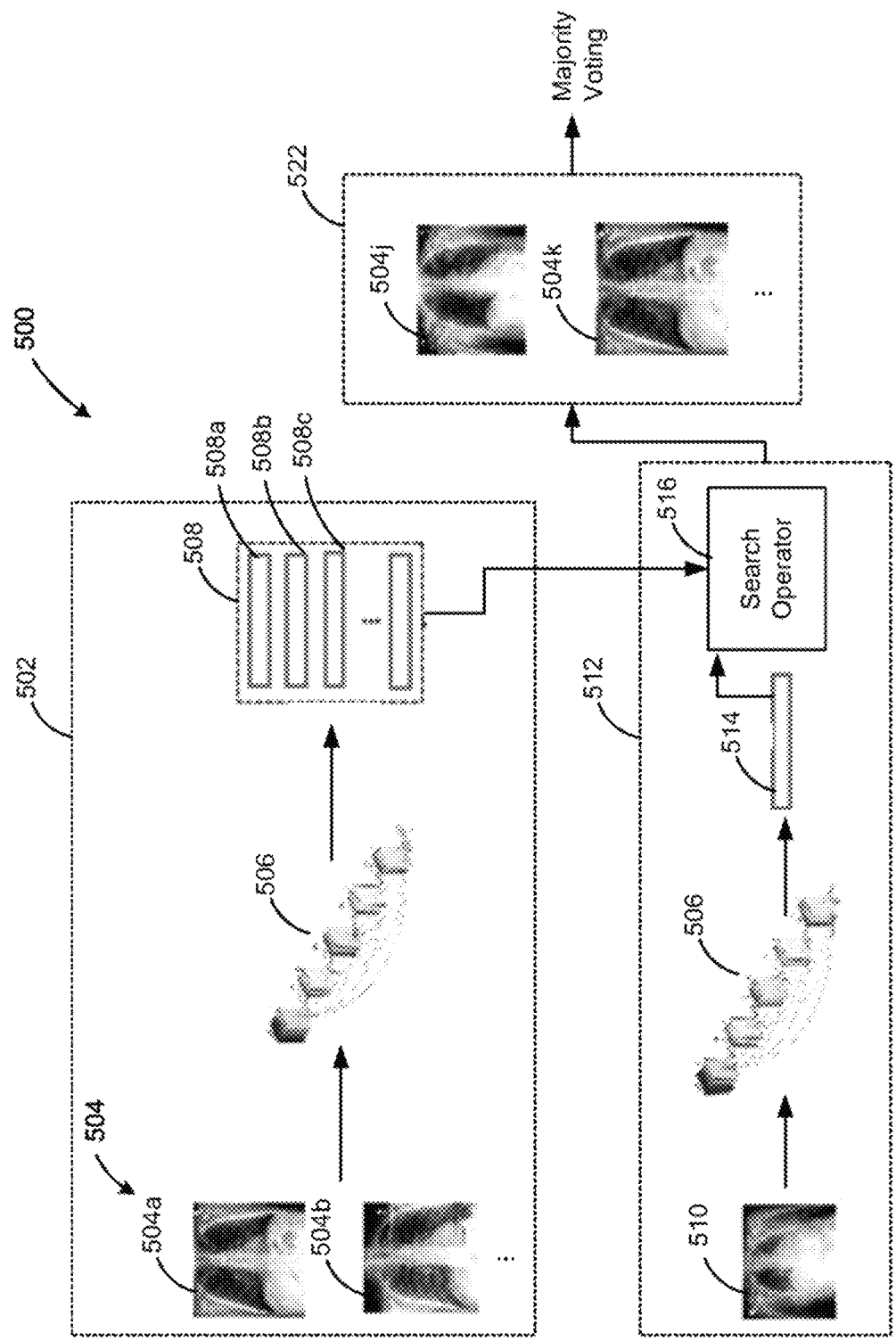
FIG. 13 is an illustration of an example method of diagnosing a query X-ray image, in accordance with an example embodiment.

Referring now to FIG. 13, shown therein is an illustration 500 of an example method of diagnosing a query X-ray image, such as query X-ray image 510. As shown in FIG. 13, the method includes three phases: an annotation phase 502; a search phase 512; and a classification phase 522.

In the annotation phase 502, the processor 112 applies an artificial neural network (ANN) 506 to each of one or more X-ray images 504a, 504b, ... (collectively referred to as one or more X-ray images 504) stored in an image database, such as the data storage component 116 or the external data storage 130. The X-ray images can be but is not limited to chest X-ray images as shown in FIG. 13. The processor 112 annotates each of the one or more X-ray images 504 with a respective feature vector 508a, 508b, 508c, ... (collectively referred to as one or more feature vectors 508) obtained from the ANN 506. The one or more feature vectors 508 can be stored in the image database. The feature vectors 508 can be generated from any of the methods and systems described herein.

In the search phase 512, the processor 112 applies the ANN 506 to a query X-ray image 510 to extract a query feature vector 514. The processor 112 applies a search operator 516 to search the annotated image database for X-ray images that are similar to the query X-ray image 510. The search 516 can involve determining a similarity level between the query feature vector and the feature vectors generated in the annotation phase 502 for the one or more X-ray images stored in the image database and identifying a set of feature vectors that satisfy a similarity threshold. The similarity level and threshold can be determined from any of the methods and systems described herein. The processor 112 retrieves, from the image database, the set of annotated X-ray images 504j, 504k (collectively referred to as the set of annotated X-ray images 522) having feature vectors that satisfy the similarity threshold.

In the classification phase 522, the processor 112 classifies the query X-ray image 510 based on the set of X-ray images 522 that are identified as being similar to the query X-ray image 510 in the search phase 512. The classification can include a disease present/absent identifier. Furthermore, the disease present or disease absent classifications can include a disease type.

For example, the processor 112 classifies the query X-ray image 510 based on whether a total number of a subset of the set of X-ray images 522 identified in the search phase 512 is greater than a majority threshold. For example, the processor 112 classifies the query X-ray image as exhibiting disease if more than half (e.g., a simple majority) of the set of annotated X-ray images 522 identified in the search phase 512 are classified as exhibiting disease. That is, if at least half of the set of annotated X-ray images 522 are classified as exhibiting disease, the processor 112 classifies the query X-ray image 510 as exhibiting disease.

Figure 14:
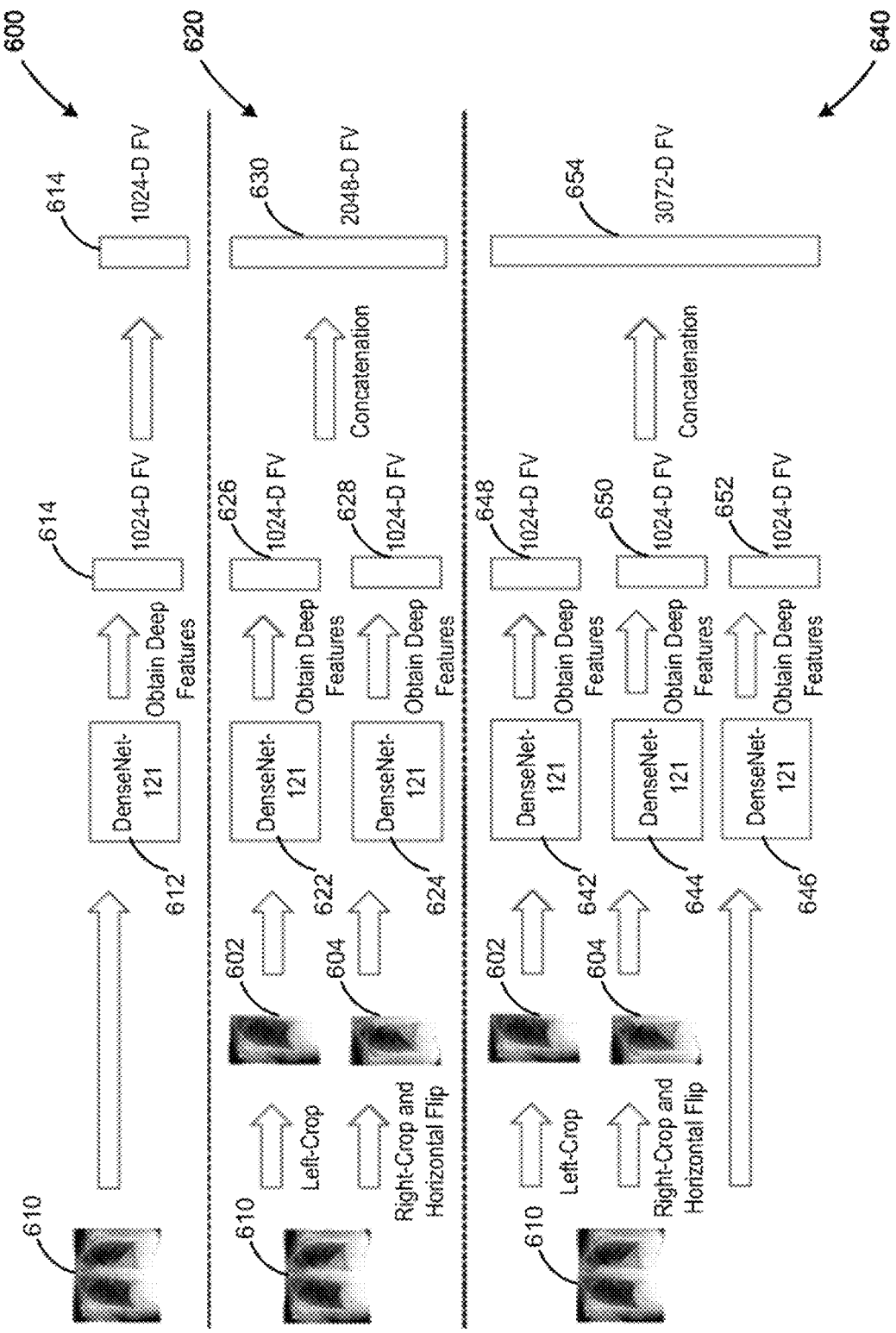
FIG. 14 is an illustration of example configurations for extracting query feature vectors for a query X-ray image, in accordance with example embodiments.

Referring now to FIG. 14, shown therein are example configurations 600, 620, and 640 for extracting query feature vectors for a query X-ray image. In each of the example configurations 600, 620, and 640, the processor 112 uses pre-trained or fine-tuned deep neural network (DNN) architecture to extract deep features from the query X-ray image, such as query X-ray image 610.

In example configuration 600, the processor 112 uses the entire query X-ray image 610. The processor 112 applies a DNN 612, such as DenseNet-121, to the entire query X-ray image 610 to obtain a query feature vector 614. When using DenseNet-121 as the DNN 612, the query feature vector 614 has a dimension of 1,024.

In example configuration 620, the processor 112 generates a first query image portion 602, such as a left portion of the query X-ray image 610, and a second image query portion 604, such as a right portion of the query X-ray image 610 that is horizontally flipped. The processor 112 applies DNNs, such as DenseNet-121 622 and 624, to each of the query image portions 602 and 604 to obtain a first query image portion feature vector 626 and a second query image portion feature vector 628. When using DenseNet-121 as the DNNs 622 and 624, each of the first query image portion feature vector 626 and the second query image portion feature vector 628 have a dimension of 1,024.

The processor 112 combines the query image portion feature vectors 626, 628 to provide the query feature vector 630 for the query X-ray image 610. As shown in FIG. 14, the processor 112 concatenates the query image portion feature vectors 626, 628 so that the query feature vector 630 has a dimension of 2,048. Other methods of combining the query image portion feature vectors 626, 628 are possible. Furthermore, although two DNNs 622, 624 are shown in FIG. 14, configuration 620 can include fewer or more DNNs. For example, one DNN can be applied sequentially to the first query image portion 602 and the second query image portion 604.

In example configuration 640, the processor 112 generates a first query image portion 602, such as a left portion of the query X-ray image 610, and a second image query portion 604, such as a right portion of the query X-ray image 610 that is horizontally flipped. The processor 112 applies DNNs, such as DenseNet-121 642, 644, and 646 to each of the query image portions 602 and 604 and the entire query X-ray image 610 to obtain a first query image portion feature vector 648, a second query image portion feature vector 650, and an entire query image feature vector 652, respectively. When using DenseNet-121 as the DNNs 642, 644, and 646, each of the first query image portion feature vector 648, the second query image portion feature vector 650, and the entire query image feature vector 652 have a dimension of 1,024.

The processor 112 combines the query image portion feature vectors 648, 650, and the entire query image feature vector 652 to provide the query feature vector 654 for the query X-ray image 610. As shown in FIG. 14, the processor 112 concatenates the query image portion feature vectors 648, 650, and the entire query image feature vector 652 so that the query feature vector 654 has a dimension of 3,072. Other methods of combining the query image portion feature vectors 648, 650, and the entire query image feature vector 652 are possible. Furthermore, although three DNNs 642, 644, and 646 are shown in FIG. 14, configuration 640 can include fewer or more DNNs. For example, one ANN can be applied sequentially to each of the first query image portion 602, the second query image portion 604, and the query X-ray image 610.

In some embodiments, processor 112 identifies portions of the query X-ray image in which disease is present. To assist with the description of identifying portions of the query X-ray image in which disease is present, reference will be made simultaneously to FIG. 15A to FIG. 15E.

Figures 15A, 15B:
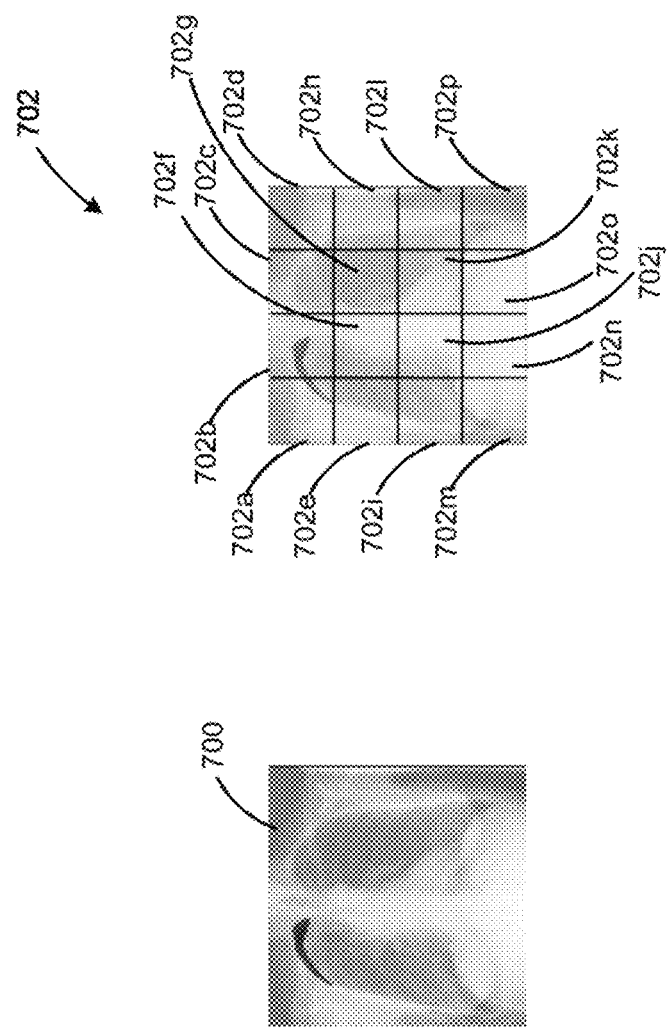
FIG. 15A is another example X-ray image.
FIG. 15B is the X-ray image of FIG. 15A divided into one or more example image portions, in accordance with an example embodiment.

The processor 112 divides a query X-ray image, such as example query X-ray image 700 shown in FIG. 15A, into one or more query image portions. As shown in the example of FIG. 15B, the processor 112 divides query X-ray image 700 into one or more query image portions 702a, 702b, 702c, ... 702p (collectively referred to as the one or more query image portions 702). Although 16 query image portions are shown in FIG. 15B, it will be understood that the processor 112 can divide the query X-ray image into fewer or more query image portions. Furthermore, although the query X-ray image is shown in FIG. 15B as being divided into 4×4 query image portions, it will be understood that the processor 12 can divide the query X-ray image into a different number of query image portions vertically and horizontally.

In some embodiments, where the processor 112 preprocessed the image to generate query image portions, the processor 112 uses the query image portions from preprocessing as the one or more query image portions 702. In some embodiments, the processor 112 further divides the query image portions from preprocessing to obtain the one or more query image portions 702. In some embodiments, the processor 112 divides the query X-ray image to obtain the one or more query image portions 702 that can be different from the query image portions from preprocessing.

For each query image portion 702, the processor 112 generates a value to represent the image characteristics within the query image portion 702. The processor 112 applies an artificial neural network model to the query X-ray image portion 702 to extract a query image portion feature vector representative of image characteristics of that query image portion 702. The processor 112 uses the query image portion feature vector to extract the value representing the image characteristics within the query image portion 702. The processor 112 generates the query feature vector to include the values representing the image characteristics within each query image portion 702.

Figure 15C:
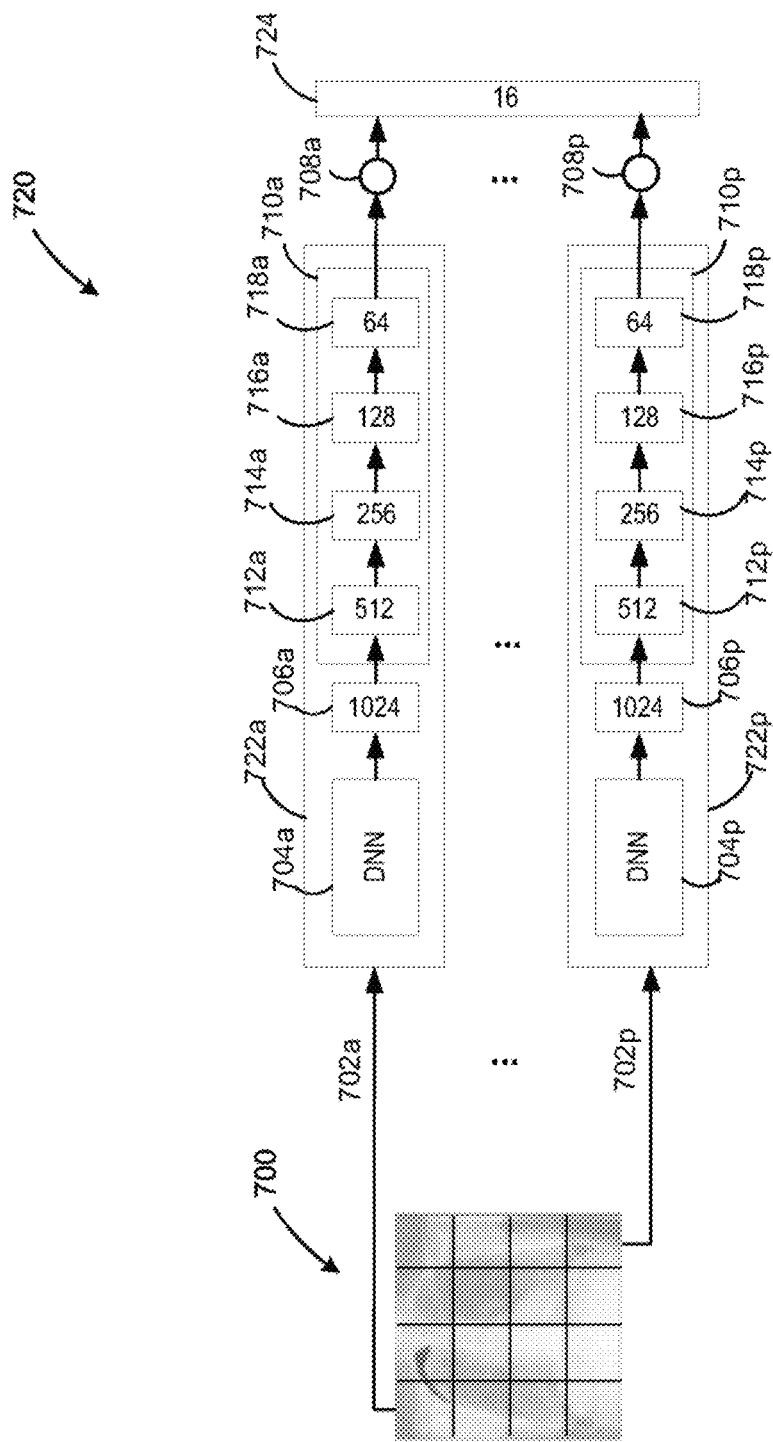
FIG. 15C is a diagram illustrating an example configuration for generating a query feature vector for the example X-ray image of FIG. 15A, in accordance with an example embodiment.
Figure 15D:
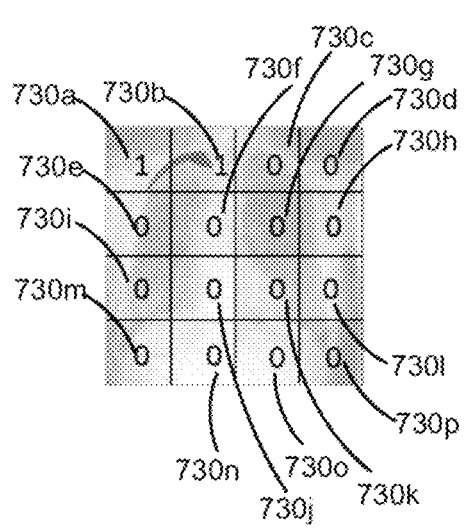
FIG. 15D shows an example of disease present/absent identifiers for each of the example image portions of FIG. 15B, in accordance with an example embodiment.

FIG. 15C shows an example configuration 720 for generating a query feature vector to include the values representing the image characteristics within each query image portion 702. The processor 112 operates a feature extractor, such as feature extractors 722a . . . 722p (collectively referred to as feature extractors 722), to process each query image portion 702 of the query image 700.

For example, the feature extractor 722a includes an artificial neural network model 704a that extracts an n-dimensional query image portion feature vector 706a and an encoder 710a to reduce the n-dimensional query image portion feature vector 706 to a 1-dimensional query image portion feature vector or a query image portion value 708a. That is, the feature extractor 722a includes feature compression to reduce the size of feature vectors extracted by the artificial neural network model 704. In some embodiments, feature compression reduces an n-dimensional feature vector to a value (i.e., a 1-dimensional feature vector).

As shown in the example in FIG. 15C, the artificial neural network model 704a is a deep neural network model (DNN) that generates a query image portion feature vector 706a for query image portion 702a, The DNN can be, but is not limited to, DenseNet121. With DenseNet121, the query image portion feature vector 706a has 1,024 dimensions.

The processor 112 operates encoder 710a to progressively generate smaller feature vectors. Namely, encoder 710a uses query image portion feature vector 706a having a dimension of 1024 to generate feature vector 712a having a dimension of 512. Then, encoder 710a uses feature vector 712a to generate feature vector 714a having a dimension of 256. Further, encoder 710a uses feature vector 714a to generate feature vector 716a having a dimension of 256, feature vector 718a having a dimension of 64, and the 1-dimensional feature vector 708a. Any one or more of the feature vectors 706a, 712a, 714a, 716a, 718a, and 708a can include real-valued numbers.

Likewise, the processor 112 operates a feature extractor 722 for each of the query image portions 702 to obtain query image portion values 708a, . . . 708p (collectively referred to as the values 708) representing the image characteristics within each query image portion 702. The processor 112 operates a combination operator, such as a concatenation operator to combine the query image portion values 708 to generate the query feature vector 724. Although one feature extractor 722 is shown for each query image portion 702 in FIG. 15C, other configurations can include fewer or more feature extractors 722.

The processor 112 compares the query feature vector 724 including the values 708 for each of the one or more query image portions 702 with the one or more annotated feature vectors to determine the similarity level between each query image portion 702 and a related annotated image portion of the one or more annotated X-ray images. The processor 112 associates each query image region 702 with a set of annotated image portions based at least on the similarity level and the similarity threshold; and assign each query image portion 702 with the disease classification based at least on the disease classification of one or more annotated image portions of the set of annotated image portions. In some embodiments, the disease classification assigned to each query image portion is one of a disease present identifier and a disease absent identifier indicating presence or absence of diseases within the query image portion. For example, the processor 112 assigns the example disease present or absent identifiers 730a, 730b, 730c, . . . 730p (collectively referred to as disease present/absent identifiers 730) shown in FIG. 15D to the respective query image portions 702 of FIG. 15B.

In some embodiments, the processor 112 reiterates the process of identifying query image portions in which disease is present to identify a diseased region within the query image. That is, the processor 112 fine-tunes the identification of portions of the query image in which disease is present to identify a diseased region. To assist with the description of identifying a diseased region within the query image, reference will be made simultaneously to FIG. 15E to FIG. 15G.

Figure 15E:
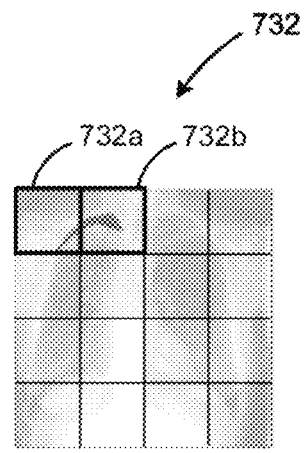
FIG. 15E is a diagram illustrating an identification of image portions indicating disease in the image of FIG. 15A, in accordance with an example embodiment.

The processor 112 identifies query image portions 702 assigned the disease classification associated with a disease present identifier. For example, based on disease present identifiers 730a and 730b of FIG. 15D, the processor 112 identifies two query image portions 732a and 732b (collectively referred to as query image portions in which disease is present 732) as shown in FIG. 15E. Although disease is shown as being present in only two query image portions in FIG. 15E, it will be understood that disease can be present in fewer or more query image portions 702.

The processor 112 defines a set of related query image portions for each query image portion 732 identified as being assigned the disease classification associated with the disease present identifier. For each related query image portion, the processor 112 applies an artificial neural network model to extract a related query image region feature vector representative of image characteristics of that related query image portion. Similar to 202, the processor 112 operates a feature extractor, such as feature extractor 320, to obtain a related query image region feature vector for each related query image portion.

The processor 112 compares the related query image region feature vector with one or more annotated image region feature vectors associated with respective one or more annotated image portions to determine the similarity level between that related query image portion and each annotated image portion. Similar to 204, the processor 112 uses an image search operator, such as image search operator 404, to determine a similarity level between each related query image portion and each annotated image portion.

The processor 112 associates that related query image portion with a set of annotated image portions based at least on the similarity level and the similarity threshold. Similar to 206, the processor 112 uses an image search engine, such as image search engine 402 to associate each related query image portion with a set of annotated image portions.

The processor 112 assigns that related query image portion with the disease classification based at least on the disease classification of one or more annotated image portions. Similar to 208, the processor 112 assigns each related query image portion a disease classification based on the disease classification of one or more annotated image portions of the set of annotated image portions. In some embodiments, the disease classification can include a disease present identifier or a disease absent identifier. In some embodiments, the disease classification includes a disease type. The processor 112 identifies a diseased region, such as diseased region 738 of FIG. 15G, within the query X-ray image based on one or more related query image portions assigned with the disease classification associated with the disease present identifier.

In some embodiments, the processor 112 defines a set of related query image portions for a query image portion in which disease is present 732 by dividing the query image portion in which disease is present 732 into one or more related query image portions. That is, the set of related query image portions for a query image portion in which disease is present 732 can include a portion or sub-image of that query image portion in which disease is present 732.

In some embodiments, the processor 112 defines one or more related query image portions based on a predefined distance from a center of that query image portion in which disease is present 732. That is, the set of related query image portions for a query image portion in which disease is present 732 can include a query image portion within a surrounding of or neighboring the query image portion in which disease is present 732.

Figure 15F:
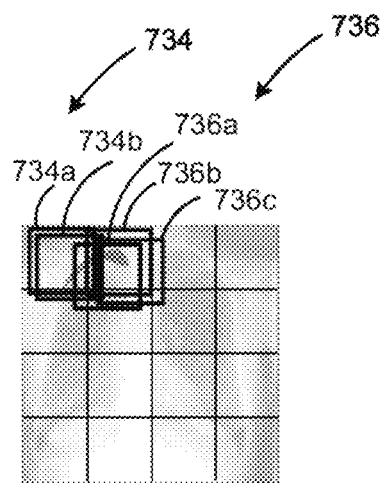
FIG. 15F is a diagram illustrating sets of related image portions for the image portions identified as indicating disease of FIG. 15E, in accordance with an example embodiment.
Figure 15G:
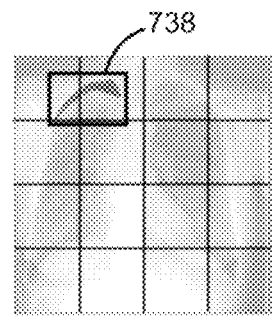
FIG. 15G is a diagram illustrating a disease region in the image of FIG. 15A.

Example sets of related query image portions for the query image portions in which disease is present 732 is shown in FIG. 15F. For example, the processor 112 defines a set of related query image portions 734a and 734b (collectively referred to as the set of related query image portions 734) based on predefined distance from a center of the query image portion 732a. As well, the processor 112 can define related query image portions 736a, 736b, and 736c (collectively referred to as the set of related query image portions 736) based on predefined distance from a center of the query image portion 732b. Although only two and three related query image portions are shown in FIG. 15F for query image portions 732a and 732b respectively, it will be understood that the sets of related query image portions for each query image portion 732a, 732b can include fewer or more query image portions.

In some embodiments, the processor 112 defines a set of related query image portions for a query image portion in which disease is present 732 to include both one or more sub-images of that query image portion 732 and one or more query image portions 734 within a surrounding of the query image portion in which disease is present 732.

In some embodiments, the one or more related query image portions include an overlapping portion with each other. As shown in FIG. 15F, related query image portions 734a and 734b include overlapping portions. Likewise, related query image portions 736a, 736b, and 736c include overlapping portions.

Figure 16:
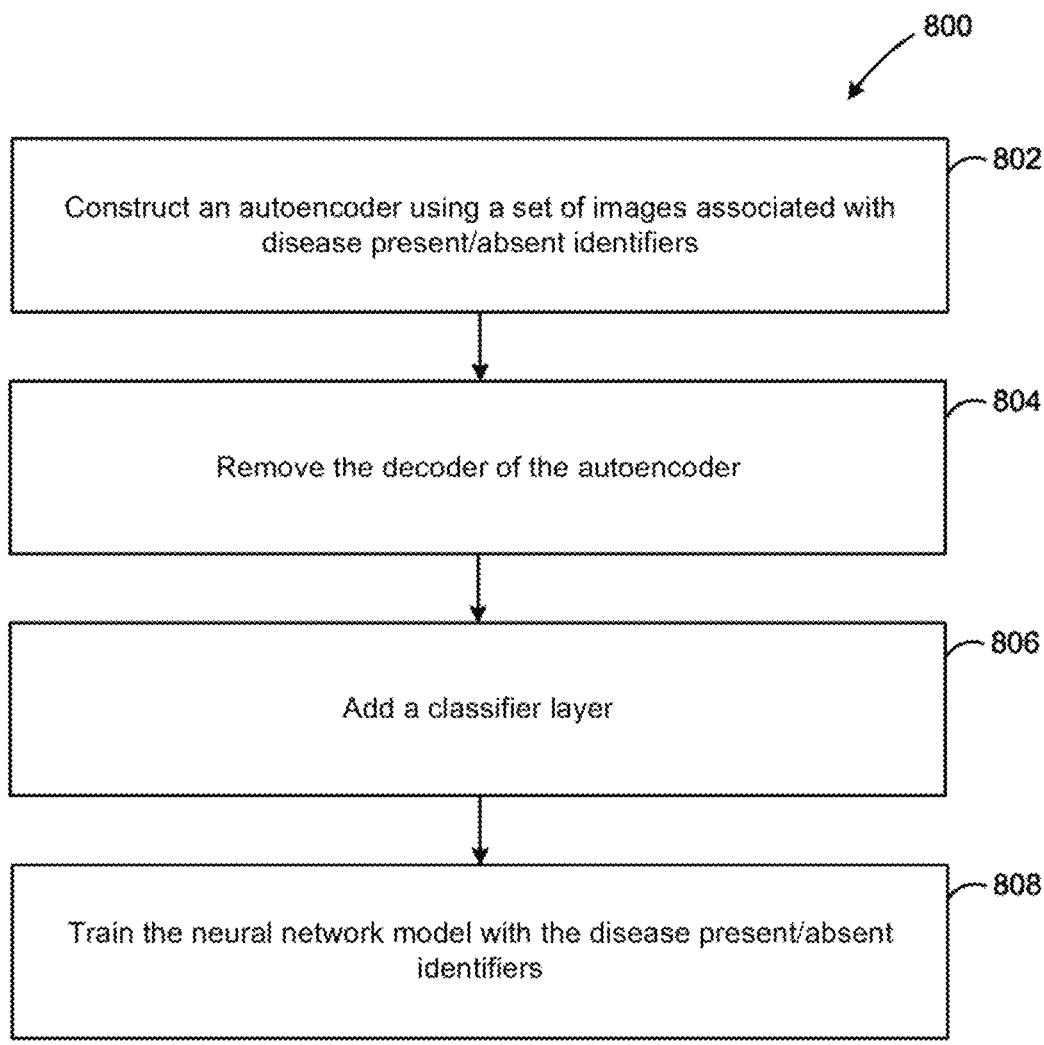
FIG. 16 is a flowchart of an example method of constructing an artificial neural network model, in accordance with an example embodiment.

Referring now to FIG. 16, an example method 800 for constructing an artificial neural network model is shown in a flowchart diagram. To assist with the description of the method 800, reference will be made simultaneously to FIG. 17A to FIG. 17C. A medical image diagnostic system, such as medical diagnostic system 110 having a processor 112 can be configured to implement method 800. The artificial neural network model can be a deep neural network model, such as deep neural network model 394 of FIG. 11, deep neural network models 612, 622, 624, 642, 644, and 646 of FIG. 14, or deep neural network models 704 of FIG. 15C.

The deep neural network model can include an autoencoder that can reduce the dimensions of feature vectors. For example, the query feature vector 654 obtained from example configuration 640 of FIG. 14 is the largest feature vector amongst example configurations 600, 620, and 640 of FIG. 14. For illustrative purposes, the method 800 will be described with reference to the query feature vector 654. However, it will be understood that the method 800 can be applied to other feature vectors.

Method 800 begins at 802. The processor 112 obtains one or more annotated X-ray images, such as example images 370 of FIG. 9B. The one or more annotated X-ray images 370 can be stored in an annotated image database, such as data storage component 116 or external data storage 130. The one or more annotated X-ray images can be associated with disease present/absent identifiers, such as 372 of FIG. 9B. The processor 112 can provide the one or more annotated X-ray images 370 to a deep neural network model constructor.

Figure 17A:
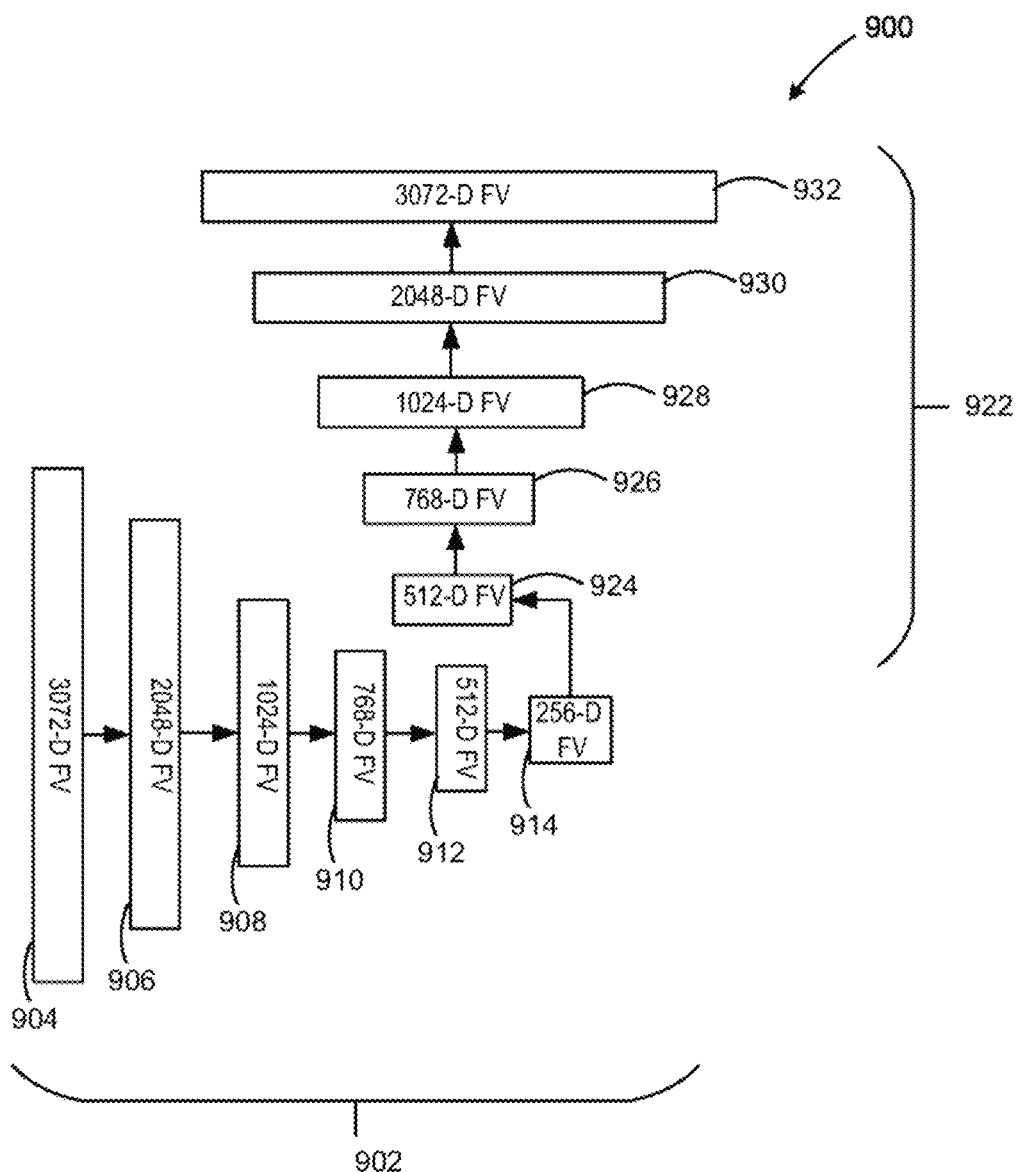
FIG. 17A is a schematic representation of the architecture of an example autoencoder having an encoder and a decoder, in accordance with an example embodiment.

The processor 112 can use the one or more annotated X-ray images for unsupervised end-to-end training of an autoencoder having a decoder. FIG. 17A shows an example architecture of an autoencoder 900 having a decoder. The autoencoder 900 includes an encoder 902 and a decoder 922. As shown in FIG. 17A, the encoder 902 is represented by feature vectors 904, 906, 908, 910, 912, and 914 and the decoder 922 is represented by the feature vectors 924, 926, 928, 930, and 932. That is, the encoder 902 receives an input feature vector 904 having a dimension of 3,072, such as query feature vector 654 of FIG. 14, and generate feature vector 906 having a dimension of 2,048. The encoder 902 progressively generates smaller feature vectors, namely feature vector 908 having a dimension of 1,024, feature vector 910 having a dimension of 768, feature vector 912 having a dimension of 512, and feature vector 914 having a dimension of 256.

The processor 112 trains the deep neural network model by backpropagation with the input as the output. That is, the decoder 922 receive feature vector 914 having a dimension of 256 and generate feature vector 924 having a dimension of 512. The decoder 922 progressively generates larger feature vectors, namely feature vector 926 having a dimension of 768, feature vector 928 having a dimension of 1,024, feature vector 930 having a dimension of 2,048, and feature vector 932 having a dimension of 3,072, which is the same dimension as the input feature vector 904.

Other architectures for each of the encoder 902 and the decoder 922 are possible. In some embodiments, the processor 112 introduces dropout operations in each layer to reduce overfitting.

Figure 17B:
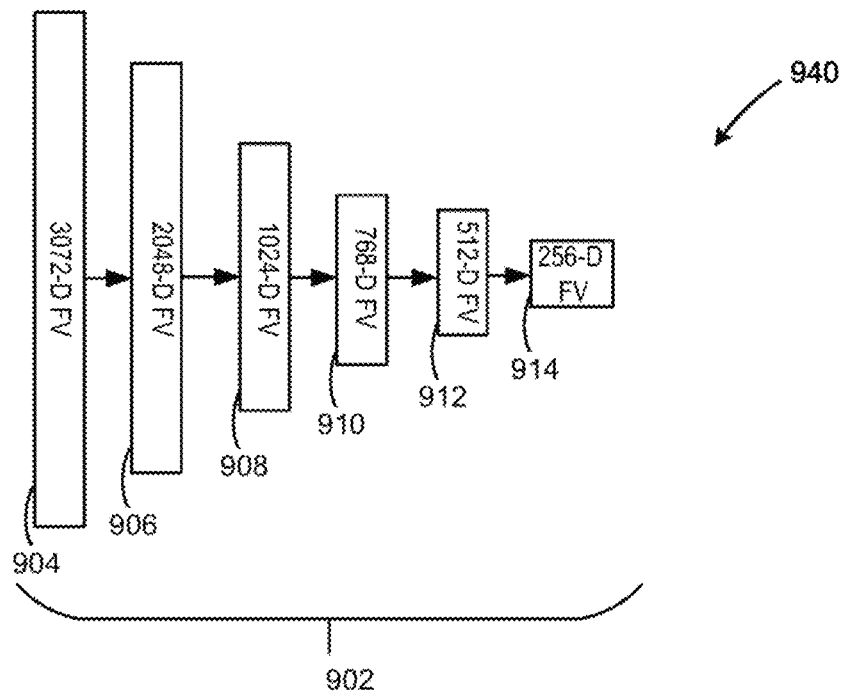
FIG. 17B is a schematic representation of the architecture of an example autoencoder of FIG. 17A without the decoder, in accordance with an example embodiment.

Having trained the autoencoder 900 to reduce the dimensions of the feature vector, the processor 112 removes the decoder 922 from the autoencoder 800 at 804. FIG. 17B shows an example architecture of an autoencoder 940 without a decoder.

Figure 17C:
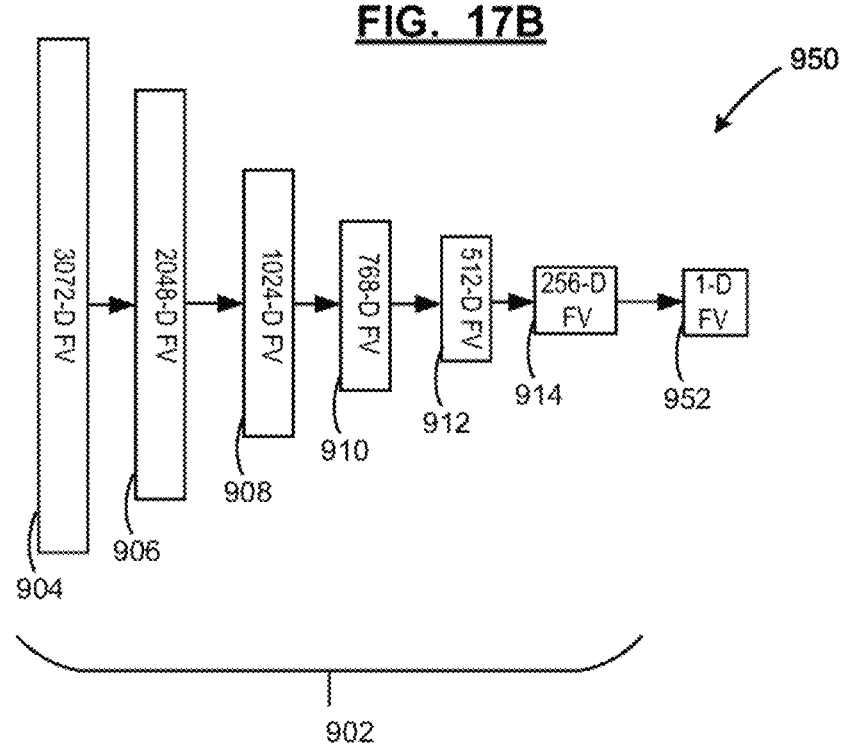
FIG. 17C is a schematic representation of the architecture of an example autoencoder of FIG. 17B with a classification layer, in accordance with an example embodiment.

At 806, the processor 112 adds a classification layer to the autoencoder 940. FIG. 17C shows an example architecture of an autoencoder 950 with a classification layer 952. The classification layer 952 can include a 1-dimensional layer of neurons with the sigmoid function as activation function. Other classification layers are possible.

At 808, the processor 112 trains the deep neural network model by backpropagation with the disease present/absent identifiers associated with the one or more annotated X-ray images. After training the deep neural network model, the processor 112 removes the 1-dimensional layer 942 to provide the autoencoder 940 shown in FIG. 1713. The deep neural network model including autoencoder 940 can be used in any of the methods and systems described herein.

In some embodiments, the deep neural network model is fine-tuned. In particular, the encoder of the autoencoder, such as encoder 902 of FIG. 1713, is further trained using disease classifications for one or more image portions of an image, such as but not limited to disease present/absent identifiers 730 shown in FIG. 15D for the one or more image portions, such as image portions 702 of entire image 700.

Figure 18A:
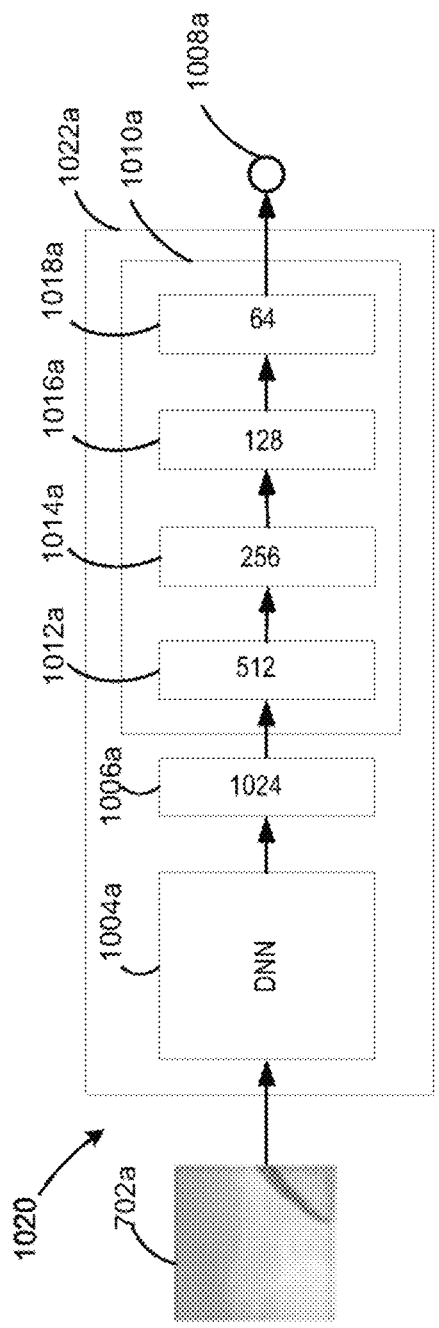
FIG. 18A is a diagram illustrating an example configuration of using an example image portion of the example image of FIG. 15A for deep neural network training, in accordance with an example embodiment.

To train the deep neural network model with the one or more image portions, the processor 112 divides an entire image, such as image 700 of FIG. 15A, into image portions. As shown in the example configuration 1020 of FIG. 18A, the processor 112 applies a feature extractor 1022a to an image portion 702a to obtain a value representing image characteristics of that image portion, such as value 1008 for image portion 702a.

The feature extractor 1022a operates a deep neural network model, such as deep neural network model (DNN) 1004a to obtain an n-dimensional feature vector that describes image characteristics of the associated image portion 702a. In some embodiments, the value of n is 1,024 and the deep neural network model 1004a generates a feature vector having 1,024 dimensions. For example, the processor 112 uses a deep neural network (DNN), such as but not limited to DenseNet121, for extracting a feature vector from an image portion, such as feature vector 1006a having 1,024 dimensions.

The feature extractor 1022a includes a series of encoders 1010a to compress or reduce the feature vector generated by the DNN to a 1-dimensional feature vector 1008a. For example, the feature vector 1006a having 1,024 dimensions is compressed to a feature vector 1012a having 512 dimensions. The feature vector 1012a having 512 dimensions is compressed to a feature vector 1014a having 256 dimensions. The feature vector 1014a having 256 dimensions is compressed to a feature vector 1016a having 128 dimensions. The feature vector 1016a having 128 dimensions is compressed to a feature vector 1018a having 64 dimensions. Finally, the feature vector 1018a having 64 dimensions is compressed to a 1-dimensional feature vector, that is a value 1008a. The value 1008a is representative of image characteristics of the image portion 702a. The value 1008a is used for classifier training.

Figure 18B:
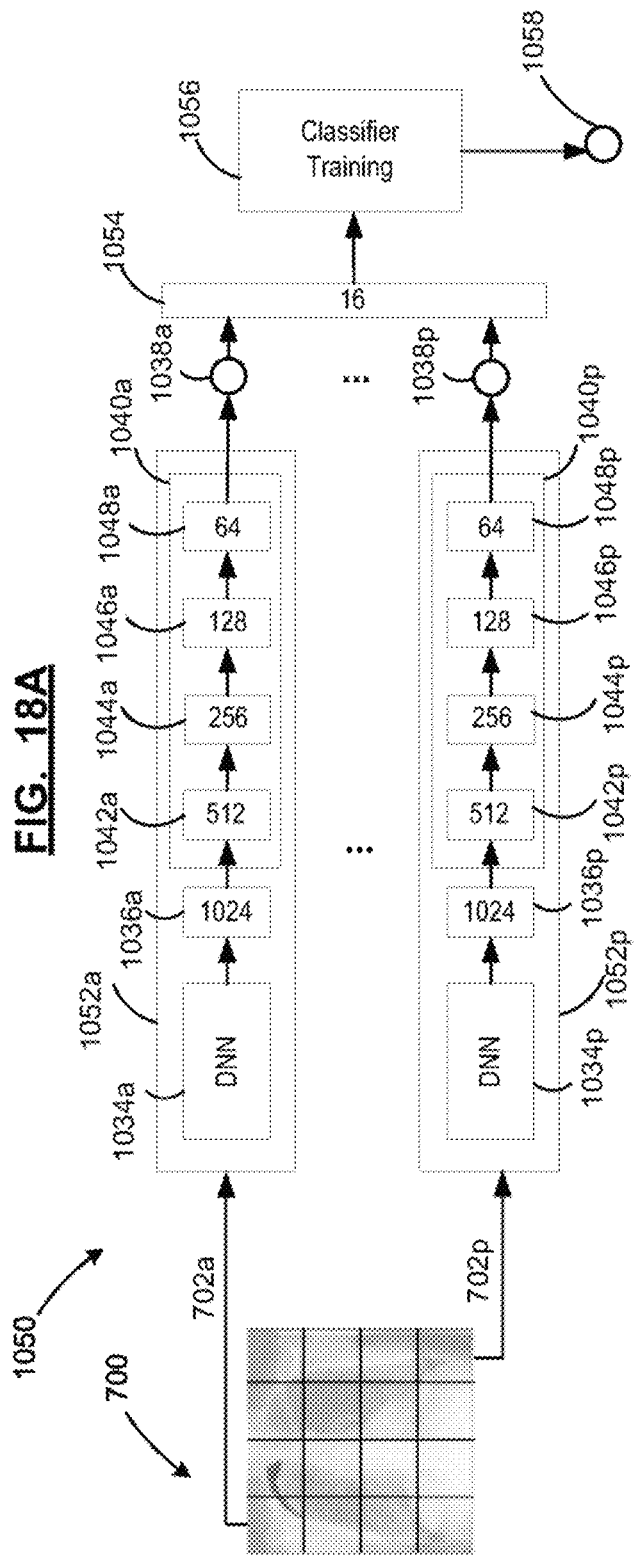
FIG. 18B is a diagram illustrating an example configuration of using the entire example image of FIG. 15A for deep neural network training, in accordance with an example embodiment.

FIG. 18B shows an example configuration 1050 for training the deep neural network model with the entire image. The processor 112 applies feature extractors 1052a . . . 1052p to image portions 702a . . . 702p respectively to obtain a value 1058 representing image characteristics of the entire image.

Similar to feature extractor 1020, each feature extractor 1052 operates a deep neural network model, such as deep neural network model (DNN) 1034a . . . 1034p (collectively referred to as deep neural network models 1034) to obtain an n-dimensional feature vector 1036a . . . 1036p that describes image characteristics of the associated image portion 702a . . . 702p. In some embodiments, the value of n is 1,024 and the deep neural network models 1034 generates feature vectors 1036a . . . 1036p (collectively referred to as feature vectors 1036) having 1,024 dimensions. For example, the processor 112 uses a deep neural network (DNN), such as but not limited to DenseNet121, for extracting a feature vector from an image portion, such as feature vectors 1036 having 1,024 dimensions.

The feature extractors 1052 include a series of encoders 1040a . . . 1040p (collectively referred to as series of encoders 1040) to compress or reduce the feature vectors generated by the DNNs to a respective 1-dimensional feature vector 1038a . . . 1038p (collectively referred to as the 1-dimensional feature vectors 1038). For example, each of the feature vectors 1036 having 1,024 dimensions are compressed to a respective feature vector 1042a . . . . 1042p (collectively referred to as feature vectors 1042) having 512 dimensions. Each of the feature vectors 1042 having 512 dimensions are compressed to a respective feature vector 1044a . . . 1044p (collectively referred to as feature vectors 1044) having 256 dimensions. Each of the feature vectors 1014 having 256 dimensions are compressed to a respective feature vector 1046a . . . 1046p (collectively referred to as feature vectors 1046) having 128 dimensions. Each of the feature vectors 1046 having 128 dimensions are compressed to a respective feature vector 1048a . . . 1048p (collectively referred to as feature vectors 1048) having 64 dimensions. Finally, each of the feature vectors 1048 having 64 dimensions are compressed to the 1-dimensional feature vectors 1038.

The 1-dimensional feature vectors 1038 are combined to generate a feature vector 1054 for the entire image 700. Since the processor 112 divided the entire image 700 into 16 image portions 702, the feature vector 1054 has 16 dimensions. The feature vector 1054 is used for classifier training 1056, such as but not limited to random forest training. For example, the processor applies random forest training to the feature vector 1054 to obtain a 1-dimensional feature vector 1058 for the entire image 700. The 1-dimensional feature vector 1058 can be a real value number.

Figure 19:
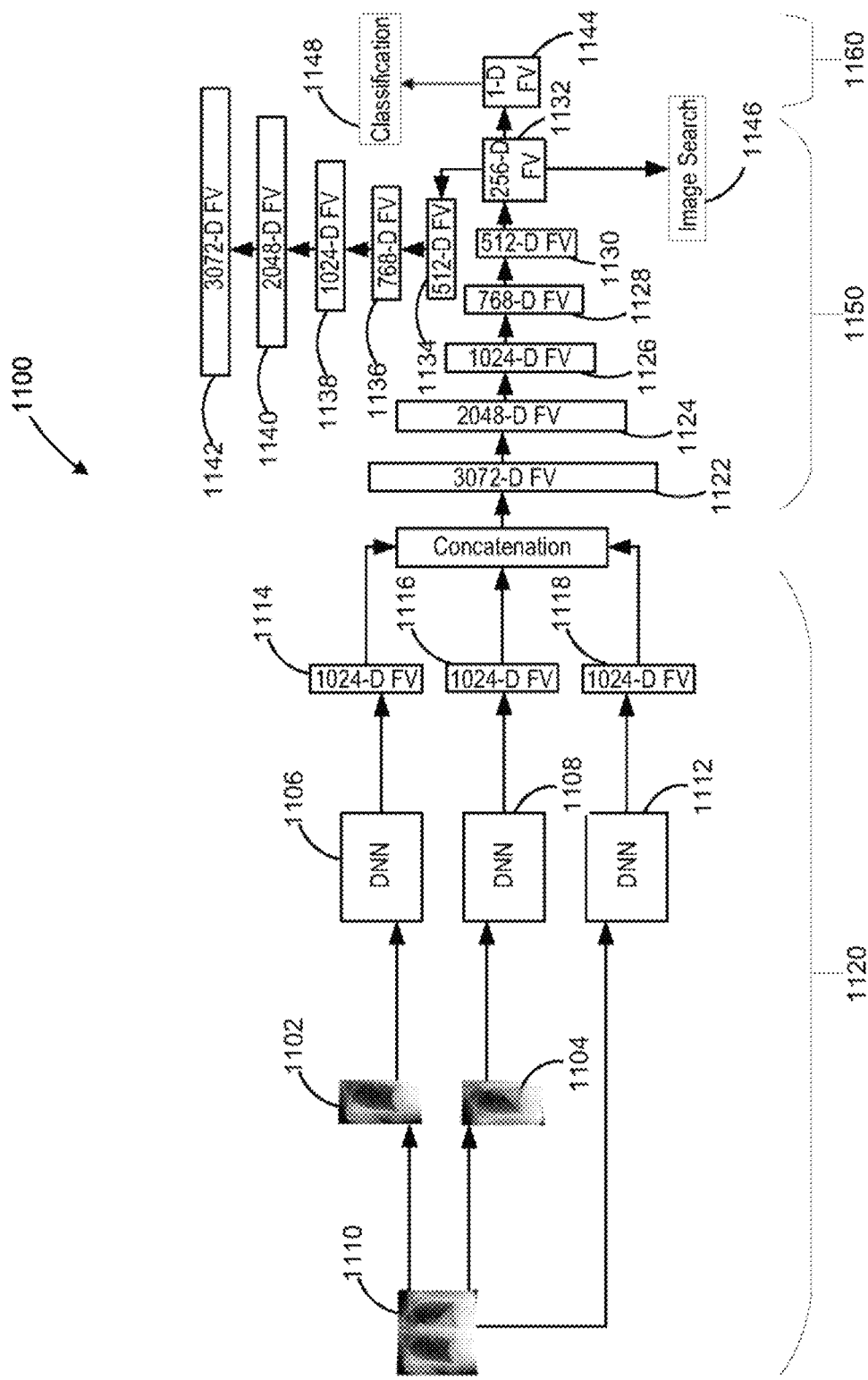
FIG. 19 is a schematic representation of an example architecture for an example method of diagnosing a query X-ray image, in accordance with an example embodiment.

FIG. 19 illustrates an example architecture 1100 for an example method of diagnosing a query X-ray image, such as query X-ray image 1110. In this example architecture 110, the processor 112 extracts one or more feature vectors, such as feature vectors 1114, 1116, and 1118, from the query X-ray image in an annotation phase 1120. Annotation phase 1120 is similar to annotation phase 502 of FIG. 13.

In the first phase 1120, the processor 112 preprocesses the query X-ray image 1110 to generate one or more query image portions, such as a first query image portion 1102 and a second query image portion 1104. The processor 112 applies an artificial neural network to each of the query X-ray image 1110 and the one or more query image portions 1102, 1104 to obtain the one or more feature vectors 1114, 1116, and 1118. For example, the processor 112 applies a deep neural network 1106 to the first query image portion 1102 to obtain the first query image portion feature vector 1114; a deep neural network 1108 to the second query image portion 1104 to obtain the second query image portion feature vector 1116; and a deep neural network 1112 to the query X-ray image 1112 to obtain an entire query image feature vector 1118. The feature vectors 1114, 1116, 1118 are concatenated to provide a query feature vector 1122. As shown in FIG. 19, each of the one or more feature vectors 1114, 1116, and 1118 have a dimension of 1,024 and so the query feature vector 1122 has a dimension of 3,072.

In a search phase 1150, the processor 112 compresses the query feature vector 1122 to obtain a feature vector for image searching 1146. The processor 112 applies a series of encoders to the query feature vector 1122 to obtain feature vector 1124 having a dimension of 2,048, feature vector 1126 having a dimension of 1,024, feature vector 1128 having a dimension of 768, feature vector 1130 having a dimension of 512, feature vector 1132 having a dimension of 256, and then feature vector 1144 having a dimension of 1. The processor 112 uses feature vector 1132 in an image search 1146 to compare the feature vector 1132 to annotated feature vectors in an annotated image database. The processor 112 determines a similarity level between the feature vector 1132 and the annotated feature vectors. The processor 112 retrieves a set of annotated images from the annotated image database having similarity levels that satisfy a similarity threshold.

In a classification phase 1160, the processor 112 uses the 1-dimensional feature vector 1144 for the query image 1110 and the set of annotated images from the search phase 1150 to determine a disease classification for the query X-ray image. The processor 1148 uses a classification operator, such as classification operator 1148, to determine the disease classification based on the disease classification of a majority of annotated images from the search phase 1150.

In some embodiments, the example architecture include a decoder during training, similar to autoencoder 900 of FIG. 17A. The decoder is represented in FIG. 19 by a series of feature vectors 1134, 1136, 1138, 1140, and 1142.

FIGS. 20A to 22B show example datasets and associated results generated from applying the methods and systems disclosed herein.

Three large public datasets of chest X-ray images were collected and merged together to assemble a test repository. FIG. 20A depicts, in a tabular format, the details of Dataset 1. Dataset 1 is prepared by composing images from MIMIC-CXR [MIT 2019], CheXpert dataset [Stanford 2019], and ChestX-ray14 [NIH 2017]. MIMIC-CXR is a large public dataset of 371,920 chest X-rays associated with 227,943 imaging studies. A total of 248,236 frontal chest X-ray images in the training set of MIMIC-CXR were included in Dataset 1. CheXpert is a public dataset for chest radiograph interpretation consisting of 224,316 chest radiographs of 65,240 patients. A total of 191,027 frontal chest x-ray images in the training set of CheXpert were included in Dataset 1. ChestX-ray14 is a public dataset of 112,120 frontal-view X-ray images of 30,805 patients. All chest X-ray images in the ChestX-ray14 dataset were included in Dataset 1. In total, 551,383 frontal chest X-ray images were used in Dataset 1, of which 34,605 images (6% of the dataset) were assigned a disease classification of pneumothorax and considered positive (+ve) class and 160,0003 images were assigned a disease classification of "no finding" and considered negative (−ve) class (i.e., normal). The annotations refer to the entire image, and the collapsed lungs are not highlighted.

FIG. 20B depicts, in a tabular format, the details of Dataset 2, which is used in experiment 2. Similar to Dataset 1, Dataset 2 is prepared by composing chest X-ray images from the MIMIC-CXR dataset, the CheXpert dataset, and the ChestX-ray14 dataset. Also, 551,383 frontal chest X-ray images were used in Dataset 2, of which 34,605 images (6% of the dataset) were assigned a disease classification of pneumothorax and considered positive (+ve) class and 516,778 images were not assigned a disease classification of pneumothorax and considered negative (−ve) class (i.e., non-pneumothorax). The images of Dataset 2 not assigned a pneumothorax classification may contain cases such as normal, pneumonia, edema, cardiomegaly, pneumonia and more.

To implement deep neural networks, a deep learning library such as, but not limited to, Keras (http://keras.io/) v2.2.4 with Tensorflow backend can be adopted. For DenseNet121, the model weight file can be obtained through the default setting of Keras. For CheXNet, the model weight file can be obtained from GitHub. For any other deep neural network architecture, weights can be initialized randomly and trained using global-level labels. Images or image portions and regions can be resized to smaller sizes, such as but not limited to 224×224 pixels, before feeding into the deep neural networks. All other parameters can be set to default settings unless further specified. Experiments were performed on a computer with 64.0 GB DDR4 RAM, an Intel Core i9-7900X @3.30 GHz CPU (10 Cores) and one GTX 1080 graphic card.

The performance of the classification phase, such as classification phase 522 of FIG. 13, can be evaluated by the area under the receiver operating characteristic curve (ROC) to enable a comparison over a range of prediction thresholds. As a 10-fold cross-validation was conducted in the experiments, average ROC was computed with 95% confidence interval.

In a first experiment series, the classification performance of image search for each of the three configurations 600, 620, and 640 of feature extraction of FIG. 14 were considered.

The processor 112 was operated to annotate all chest X-ray images with deep features. A standard 10-fold cross-validation was then adopted. The processor 112 divided the tagged chest X-ray images into 10 groups in this experiment. In each fold, one group of chest X-ray images was used as validation set, while the remaining chest X-ray images were used as training set. The above process was repeated 10 times, such that in each fold a different group of chest X-ray images was used as the validation set.

For image search, given a chest X-ray image (from the validation set), it was conducted to search in the training set and used the majority voting of the top retrieved chest X-ray images to classify. One experiment was conducted with the top 11 retrieved chest X-ray images (k=11) and another was conducted with the top 52 retrieved chest X-ray images (k=51). It will be understood that these numbers of images can vary.

Experimental results on Dataset 1 are summarized in FIG. 21A. The average ROC obtained by example configuration 640 of FIG. 14 is higher than that obtained by example configuration 600 of FIG. 14. The average ROC obtained by example configuration 620 of FIG. 14 is the lowest among the three example configurations 600, 620, and 640. These observations are consistent for both k=11 and k=51.

Experimental results on Dataset 2 are summarized in FIG. 21B. Similarly, the average ROC obtained by example configuration 640 of FIG. 14 is higher than that obtained by example configuration 600 of FIG. 14. The average ROC obtained by example configuration 620 of FIG. 14 is the lowest among the three example configurations 600, 620, and 640. These observations are consistent for both k=11 and k=51.

In a second experiment series, the possibility to construct an encoder to reduce the dimensions of the feature vector and sustaining classification performance of image search were considered. Similar to the first experiment series, both Dataset 1 and Dataset 2 were used in the second experiment series.

A standard 10-fold cross-validation was adopted. All chest X-ray images (without deep features tagged) were divided into 10 groups in this experiment. In each fold, one group of chest X-ray images was used as validation set, while the remaining chest X-ray images were used as training set. The above process was repeated 10 times, such that in each fold a different group of chest X-ray images was used as the validation set. In each fold, an encoder was trained using the training set of that fold. The encoder was then used for compressing deep features for each chest X-ray image in the testing set.

The parameters of the encoder construction process will now be described but should be understood to not be intended as limiting. In Step 1: Unsupervised end-to-end training with decoder, the training epoch and batch size were set as 10 and 128, respectively. The loss function was chosen as mean-squared-error. Adam optimizer was used. The dropout rate was chosen as 0.2, i.e., a probability of 20% setting the neuron output as zero. In Step 2 (supervised fine-tuning with labels): The loss function was chosen as binary cross-entropy. Other parameters remained the same as those set in Step 1.

For image search, given a chest X-ray image (from the validation set), the compressed deep feature was used for searching in the training set. The majority voting of the top k retrieved chest X-ray images was used to classify. One experiment was conducted with k=11 and another was conducted with k=51. For comparison, CheXNet was adopted as a baseline to be applied to the validation set in each fold.

Experimental results on Dataset 1 are summarized in FIG. 22A. The average ROC obtained via feature vector with reduced dimension is higher than that obtained by feature vector without compressed dimension. These observations are consistent for both k=11 and k=51. As a baseline comparison, the average ROC obtained via feature vector with compressed dimension, for both k=11 and k=51, is higher than that obtained by CheXNet.

Experimental results on Dataset 2 are summarized in FIG. 22B. Similarly, the average ROC obtained via feature vector with reduced dimension is higher than that obtained by feature vector without reduced dimension. These observations are consistent for both k=11 and k=51. As a baseline comparison, the average ROC obtained via feature vector with compressed dimension, for k=51, is higher than that obtained by CheXNet.

The results from the first and second experiment series appear to show that the sensitivity of image search according to the methods and systems disclosed herein can be much higher than reported diagnosis rates. The results from the second experiment series also appear to indicate that integrating region-specific deep features can enhance classification performance when using image search as a classifier according to the methods and systems disclosed herein.

From the studies, it can be seen that the use of the methods and systems disclosed herein involving image search as a classifier with region-specific features can improve classification performance with statistical significance, and thus, can likely offer a more efficient and automated diagnostic solution with explainable results. In some embodiments, the methods and systems disclosed herein can involve the use of autoencoders to compress the feature vectors to improve the classification performance. For example, the dimensionality of the feature vector can be reduced by a factor of 12 times in some embodiments. The results can also be supported by the reports and history of diagnosed cases that are associated with similar morphology, which can further increase the confidence of the results provided by the methods and systems disclosed herein.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, Internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

The invention claimed is:

1. A method for diagnosing a query X-ray image, the method comprising:
    applying an artificial neural network model to the query X-ray image to extract a query feature vector representative of image characteristics of the query X-ray image, wherein applying the artificial neural network model to the query X-ray image comprises:
        dividing the query X-ray image into one or more query image portions;
        generating a value to represent the image characteristics within each query image portions of the one or more query image portions; and
        generating the query feature vector to include the value for each query image portion;
    comparing the query feature vector with one or more annotated feature vectors associated with respective one or more annotated X-ray images stored in an annotated image database to determine a similarity level between the query X-ray image and each annotated X-ray image of the one or more annotated X-ray images;
    associating the query X-ray image with a set of annotated X-ray images based at least on the similarity level and a similarity threshold; and
    assigning the query X-ray image with a disease classification based at least on the disease classification of one or more annotated X-ray images of the set of annotated X-ray images.

2. The method of claim 1 further comprises preprocessing the query X-ray image prior to applying the artificial neural network model to the query X-ray image.

3. The method of claim 2, wherein preprocessing the query X-ray image comprises:
    dividing the query X-ray image into one or more query image portions.

4. The method of claim 3, wherein dividing the query X-ray image into the one or more query image portions comprises:
    dividing the query X-ray image substantially equally to generate a first and a second query image portion.

5. The method of claim 4, wherein the query X-ray image comprises an X-ray image of a lung, and the first and the second query image portions each corresponding to a left-side of the lung and a right-side of the lung, respectively.

6. The method of claim 5 further comprises horizontally flipping the second query image portion corresponding to the right-side of the lung.

7. The method of claim 1 further comprises:
    comparing the query feature vector with the one or more annotated feature vectors to determine the similarity level between each query image portion and a related annotated image portion of the one or more annotated X-ray images;
    associating each query image region with a set of annotated image portions based at least on the similarity level and the similarity threshold; and
    assigning each query image portion with the disease classification based at least on the disease classification of one or more annotated image portions of the set of annotated image portions.

8. The method of claim 7 further comprises:
    defining a set of related query image portions for each query image portion assigned the disease classification associated with a disease present identifier; and
    for each related query image portion:
        applying the artificial neural network model to extract a related query image region feature vector representative of image characteristics of that related query image portion;
        comparing the related query image region feature vector with one or more annotated image region feature vectors associated with respective one or more annotated image portions to determine the similarity level between that related query image portion and each annotated image portion;
        associating that related query image portion with a set of annotated image portions based at least on the similarity level and the similarity threshold; and
        assigning that related query image portion with the disease classification based at least on the disease classification of one or more annotated image portions.

9. The method of claim 8, wherein defining the set of related query image portions for each query image portion assigned the disease classification associated with the disease present identifier comprises:
    dividing the query image portion into one or more related query image portions.

10. The method of claim 8, wherein defining the set of related query image portions for each query image portion assigned the disease classification associated with the disease present identifier comprises:
    defining one or more related query image portions based on a predefined distance from a center of that query image portion.

11. The method of claim 1, wherein comparing the query feature vector with the one or more annotated feature vectors to determining the similarity level comprises:
    applying a distance transform to the query feature vector and each annotated feature vector; and
    assigning the similarity level based on a distance generated from applying the distance transform, wherein the similarity level increases with shorter distances.

12. The method of claim 1, wherein assigning the query X-ray image with the disease classification based at least on the disease classification of one or more annotated X-ray images of the set of annotated X-ray images comprises:

determining the disease classification of a majority of annotated X-ray images within the set of annotated X-ray images; and assigning the query X-ray image with the determined disease classification.

13. A system for diagnosing a query X-ray image, the system comprising:
a communication component to provide access to one or more X-ray images via a network; and
a processor in communication with the communication component, the processor being operable to:
apply an artificial neural network model to the query X-ray image to extract a query feature vector representative of image characteristics of the query X-ray image, wherein the processor is operable to:
divide the query X-ray image into one or more query image portions;
generate a value to represent the image characteristics within each query image portions of the one or more query image portions; and
generate the query feature vector to include the value for each query image portion;
compare the query feature vector with one or more annotated feature vectors associated with respective one or more annotated X-ray images stored in an annotated image database to determine a similarity level between the query X-ray image and each annotated X-ray image of the one or more annotated X-ray images;
associate the query X-ray image with a set of annotated X-ray images based at least on the similarity level and a similarity threshold; and
assign the query X-ray image with a disease classification based at least on the disease classification of one or more annotated X-ray images of the set of annotated X-ray images.

14. The system of claim 13, wherein the processor is further operable to preprocess the query X-ray image prior to applying the artificial neural network model to the query X-ray image.

15. The system of claim 14, wherein the processor is operable to divide the query X-ray image into one or more query image portions.

16. The system of claim 15, wherein the processor is operable to divide the query X-ray image substantially equally to generate a first and a second query image portion.

17. The system of claim 16, wherein the query X-ray image comprises an X-ray image of a lung, and the first and the second query image portions each corresponding to a left-side of the lung and a right-side of the lung, respectively.

18. The system of claim 17, wherein the processor is further operable to horizontally flip the second query image portion corresponding to the right-side of the lung.

19. The system of claim 13, wherein the processor is further operable to:
compare the query feature vector with the one or more annotated feature vectors to determine the similarity level between each query image portion and a related annotated image portion of the one or more annotated X-ray images;
associate each query image region with a set of annotated image portions based at least on the similarity level and the similarity threshold; and
assign each query image portion with the disease classification based at least on the disease classification of one or more annotated image portions of the set of annotated image portions.

20. The system of claim 19, wherein the processor is further operable to:
define a set of related query image portions for each query image portion assigned the disease classification associated with a disease present identifier; and
for each related query image portion:
apply the artificial neural network model to extract a related query image region feature vector representative of image characteristics of that related query image portion;
compare the related query image region feature vector with one or more annotated image region feature vectors associated with respective one or more annotated image portions to determine the similarity level between that related query image portion and each annotated image portion;
associate that related query image portion with a set of annotated image portions based at least on the similarity level and the similarity threshold; and
assign that related query image portion with the disease classification based at least on the disease classification of one or more annotated image portions.

21. The system of claim 20, wherein the processor is operable to divide the query image portion into one or more related query image portions.

22. The system of claim 20, wherein the processor is operable to define one or more related query image portions based on a predefined distance from a center of that query image portion.

23. The system of claim 13, wherein the processor is operable to:
apply a distance transform to the query feature vector and each annotated feature vector; and
assign the similarity level based on a distance generated from applying the distance transform, wherein the similarity level increases with shorter distances.

24. The system of claim 13, wherein the processor is operable to:
determine the disease classification of a majority of annotated X-ray images within the set of annotated X-ray images; and
assign the query X-ray image with the determined disease classification.

* * * * *